United States Patent
Ito et al.

(10) Patent No.: US 8,051,054 B2
(45) Date of Patent: Nov. 1, 2011

(54) METHOD AND SYSTEM FOR DATA PROCESSING WITH DATABASE UPDATE FOR THE SAME

(75) Inventors: Akira Ito, Fujisawa (JP); Kiyonori Hara, Yokohama (JP); Shuji Shimada, Yokohama (JP)

(73) Assignees: Hitachi, Ltd., Tokyo (JP); Hitachi Software Engineering Co., Ltd., Shinagawa-ku (JP)

( * ) Notice: Subject to any disclaimer, the term of this patent is extended or adjusted under 35 U.S.C. 154(b) by 707 days.

(21) Appl. No.: 12/138,931

(22) Filed: Jun. 13, 2008

(65) Prior Publication Data

US 2008/0313244 A1    Dec. 18, 2008

(30) Foreign Application Priority Data

Jun. 15, 2007  (JP) ................ 2007-158143
Jun. 3, 2008   (JP) ................ 2008-145358

(51) Int. Cl.
G06F 17/30 (2006.01)

(52) U.S. Cl. .................................... 707/695

(58) Field of Classification Search ............ 707/609, 707/638, 695, 705, 802, 821
See application file for complete search history.

(56) References Cited

U.S. PATENT DOCUMENTS

| 5,440,727 A | 8/1995 | Bhide et al. | |
|---|---|---|---|
| 6,795,827 B1 * | 9/2004 | Ohira | 1/1 |

FOREIGN PATENT DOCUMENTS

| JP | 7-084728 | 3/1995 |
|---|---|---|
| JP | 2004-145827 | 5/2004 |

OTHER PUBLICATIONS

H. Höpfner et al., "Mobile Datenbanken and Informationsysteme", 2005, Dpunkt, Verlag GMBH, Germany, XP002500566, pp. 218-224 and 236-239 (English translation).

H. Höpfner et al., "Mobile Datenbanken and Informationsysteme", 2005, Dpunkt, Verlag GMBH, Germany, XP002500566, pp. 218-224 and 236-239.

Kaloian Manassiev et al., "Scaling and Continuous Availability in Database Server Clusters through Multiversion Replication", Dependable Systems and Networks, 2007, DSN '07. 37th Annual IEEE/IFIP International Conference on, IEEE, PI, Jun. 1, 2007, pp. 666-676, XP 031116470.

* cited by examiner

Primary Examiner — Fred I Ehichioya
(74) Attorney, Agent, or Firm — Brundidge & Stanger, P.C.

(57) ABSTRACT

In a system cooperating a high performance computer and a low performance computer, a load of database processing upon the low performance computer is reduced. In a high performance center running DBMS for managing each version by using logical structure data of a database as physical structure pages and one or more terminals having a lower performance than that of the center, an update difference file is created for a center side received command input to the center, a backup file is created for a terminal side received command input to the terminal, and a version applied with the terminal side received command is updated to a version after update, by sequentially overwrite copying the backup file and update difference file.

9 Claims, 21 Drawing Sheets

FIG. 1
(a) TERMINAL SIDE RECEIVED UPDATE
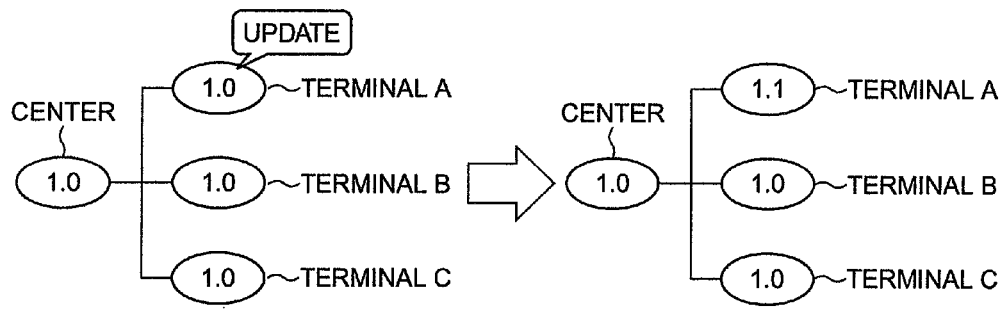
(b) CENTER SIDE RECEIVED UPDATE
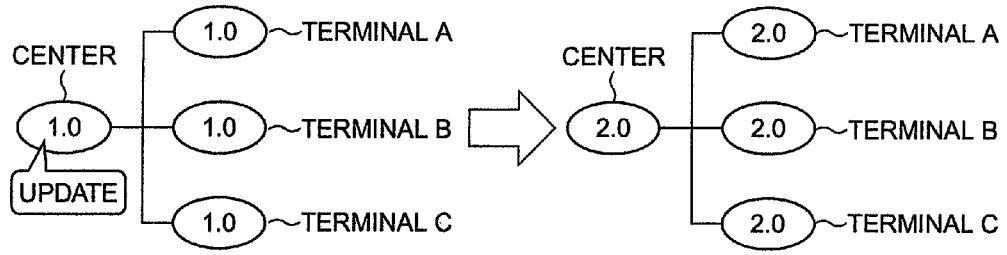
(c) CENTER SIDE RECEIVED UPDATE AFTER TERMINAL SIDE RECEIVED UPDATE
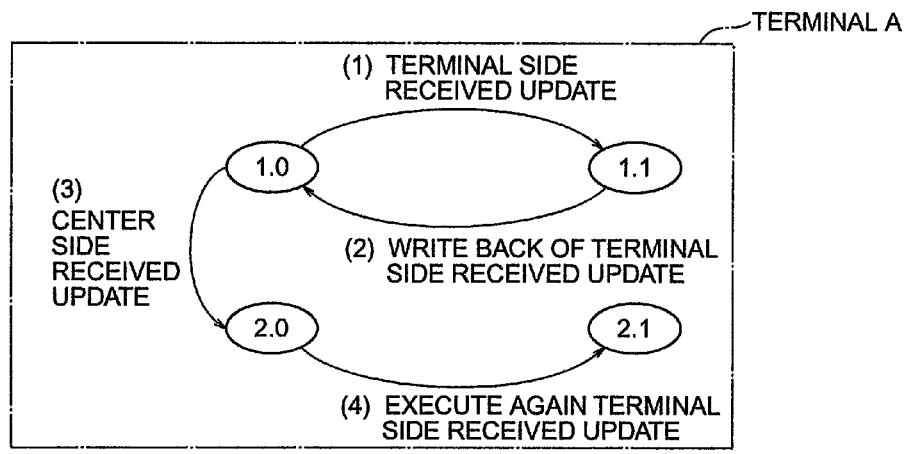

| A | B | C | D |
|---|---|---|---|
| E | F | G | H |

(b)

| A | B | C (1.1) | D (1.1) |
|---|---|---|---|
| E | F | G | H |

TERMINAL SIDE RECEIVED UPDATE [PAGES C AND D]

(c)

| A | B (2.0) | C (1.1) | D (2.0) |
|---|---|---|---|
| E | F | G (2.0) | H (2.0) |

CENTER SIDE RECEIVED UPDATE [PAGES B, D, G AND H] WITHOUT WRITING BACK PAGES C AND D (d)

| A | B (2.0) | C | D (2.0) |
|---|---|---|---|
| E | F | G (2.0) | H (2.0) |

CENTER SIDE RECEIVED UPDATE [PAGES B, D, G AND H] BY WRITING BACK PAGES C AND D (a) PAGES BEFORE CHANGE

| A | B | C | D |
|---|---|---|---|
| E | F | G | H |

(b) 
14 UPDATE DIFFERENCE FILE

| B (CHANGE) | D (CHANGE) | G (CHANGE) | H (CHANGE) |
|---|---|---|---|
| I (ADD) | J (ADD) | | |

(c) PAGES AFTER CHANGE

| A | B (CHANGE) | C | D (CHANGE) |
|---|---|---|---|
| E | F | G (CHANGE) | H (CHANGE) |
| I (ADD) | J (ADD) | | |

FIG. 9
(a)
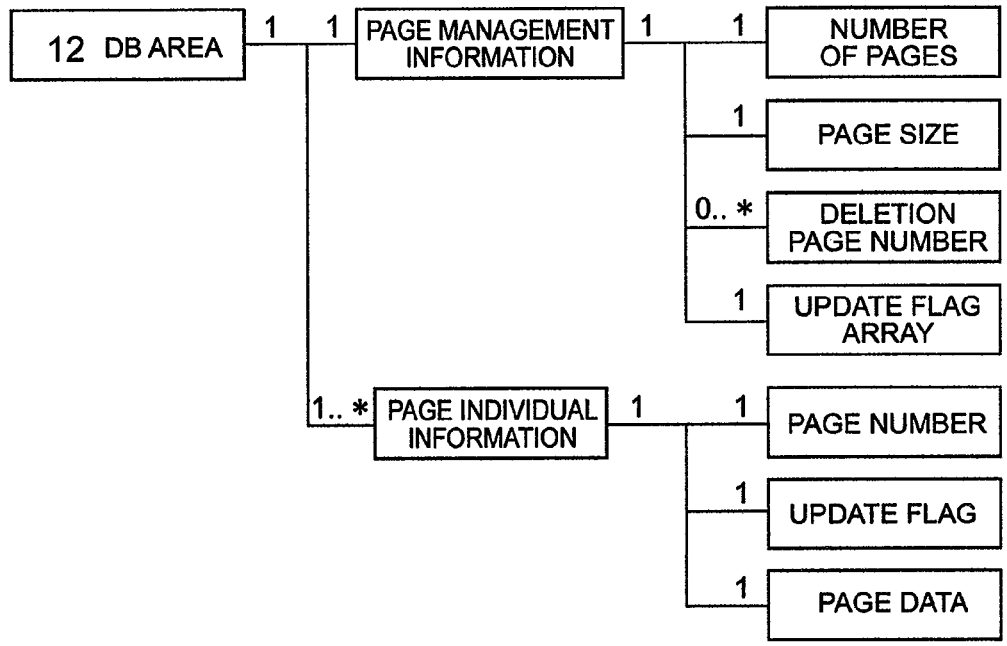
(b)
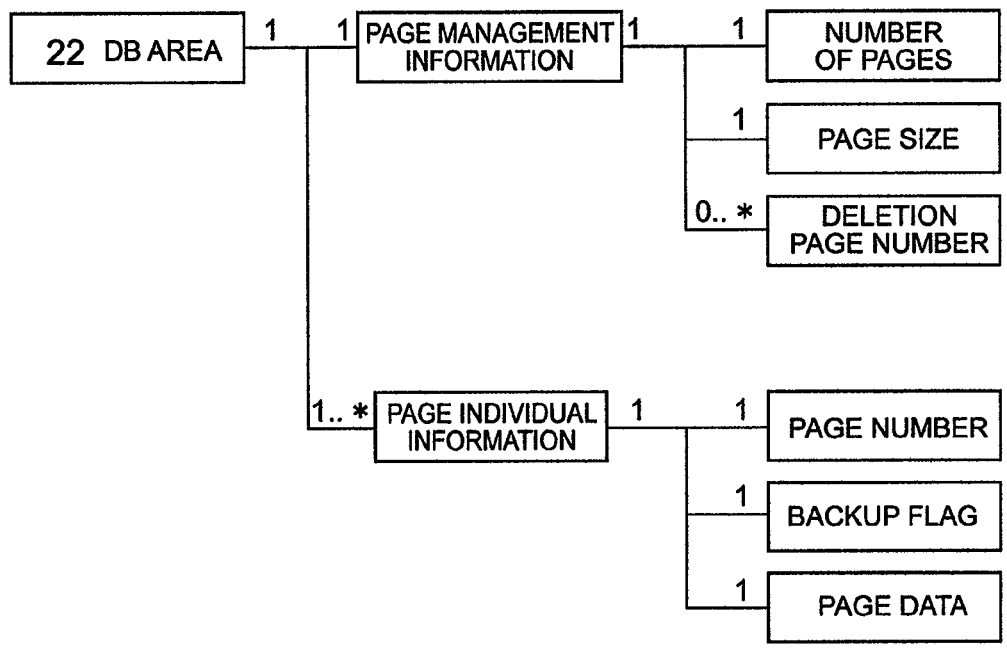

(a) PAGES BEFORE CHANGE (b) SET UPDATE FLAGS OUTSIDE PAGES (c) SET UPDATE FLAGS IN PAGES

FIG. 11
(a)
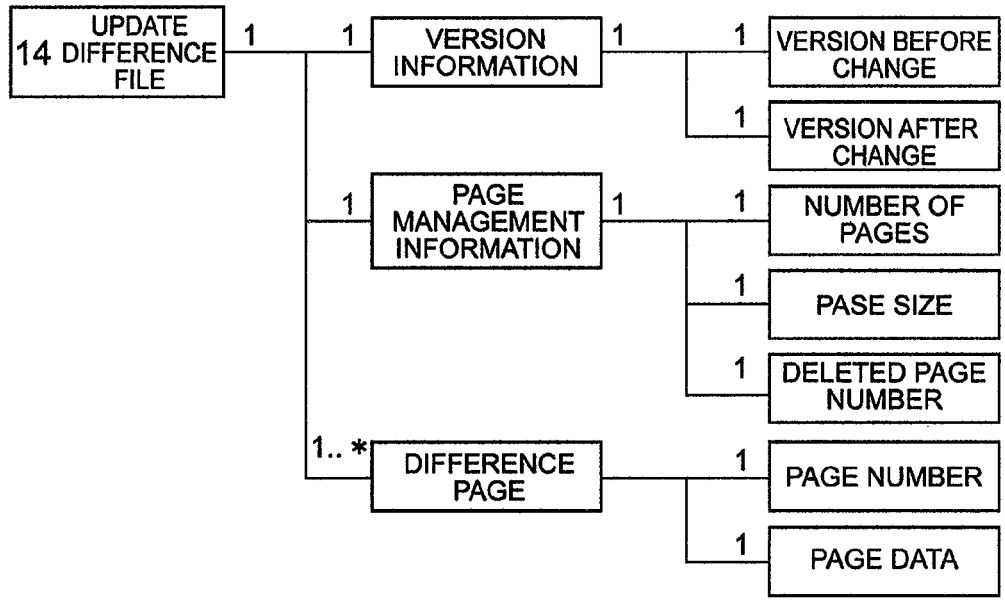
(b)
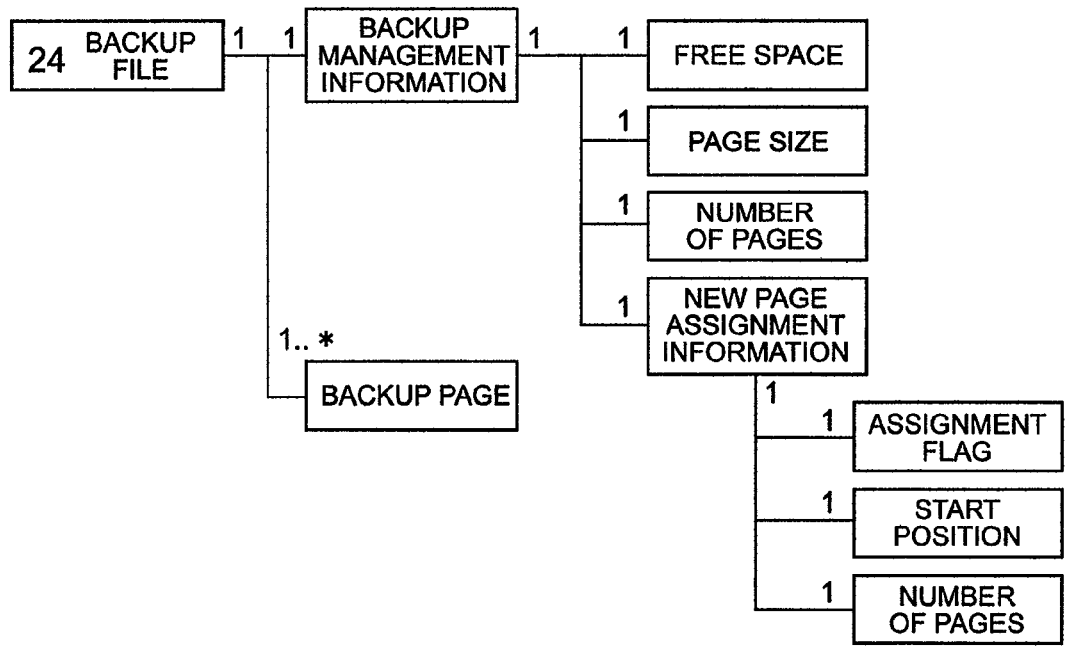

FIG. 14
(a) FULL TEXT COMPARISON METHOD WITHOUGHT USING UPDATE FLAG
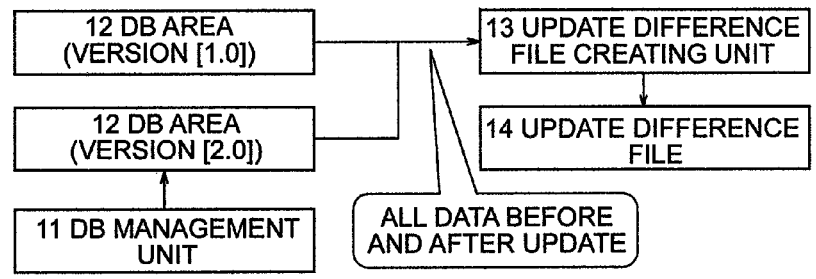
(b) METHOD OF SETTING UPDATE FLAG OUTSIDE PAGE OF DB AREA
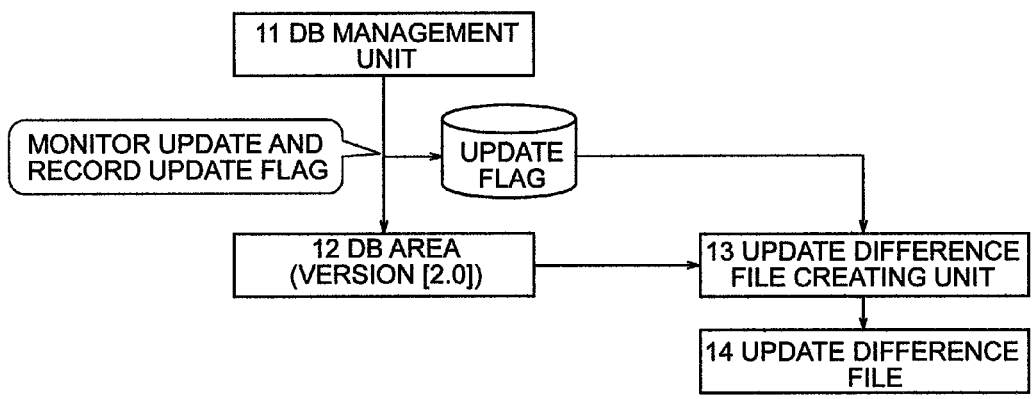
(c) METHOD OF SETTING UPDATE FLAG IN PAGE OF DB AREA
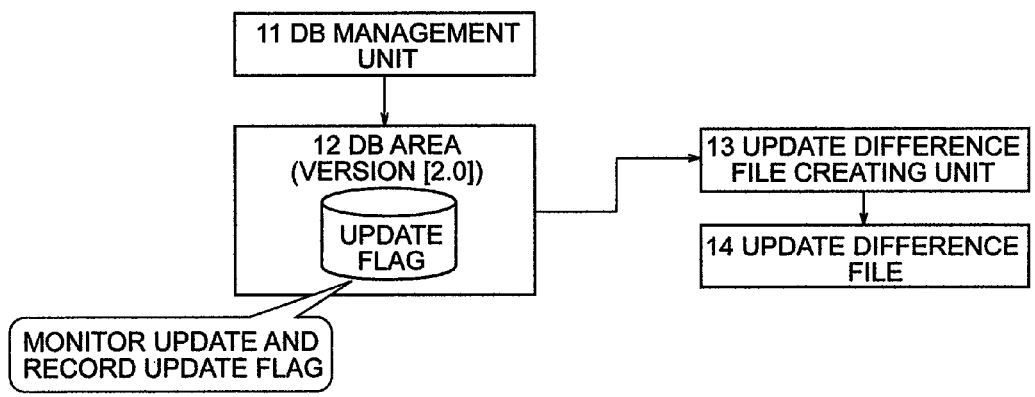

FIG. 18
(a)
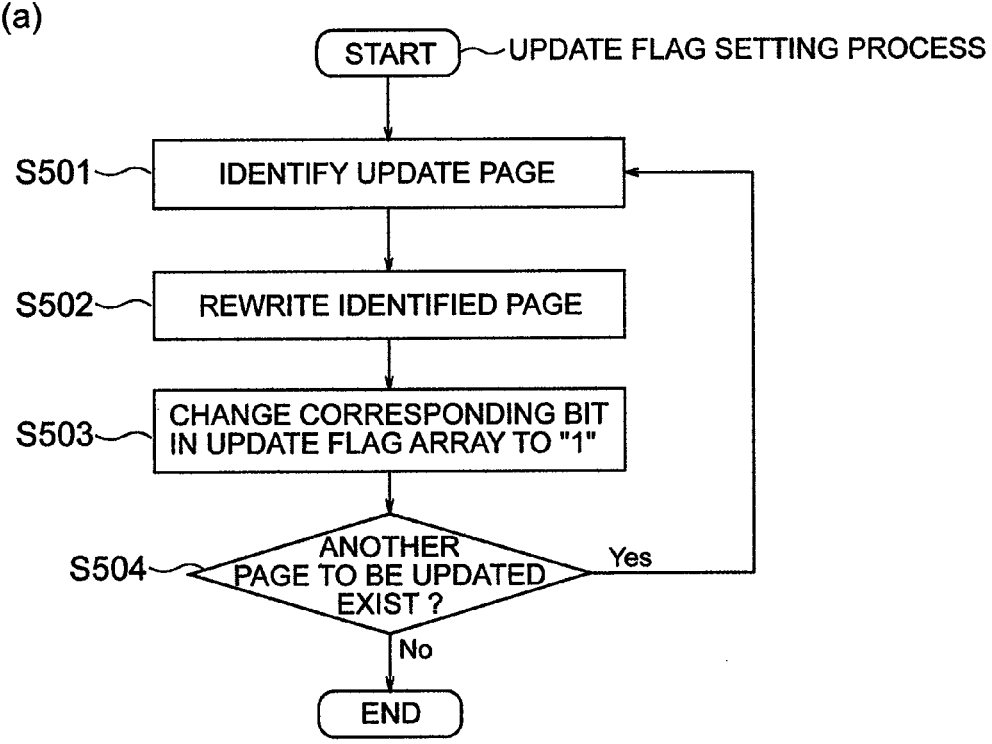
(b)
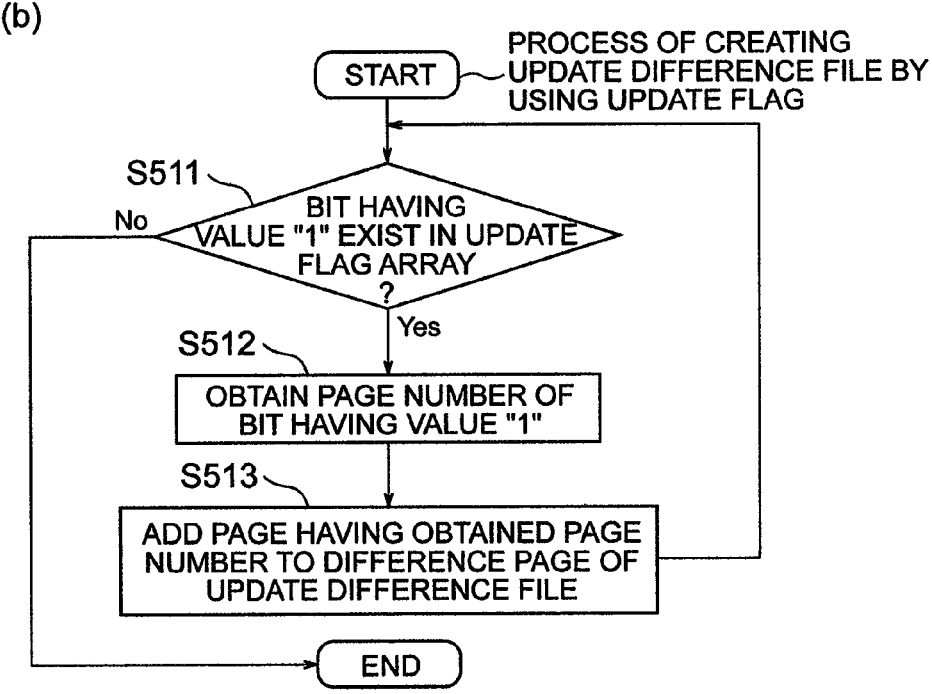

FIG. 19
(a) 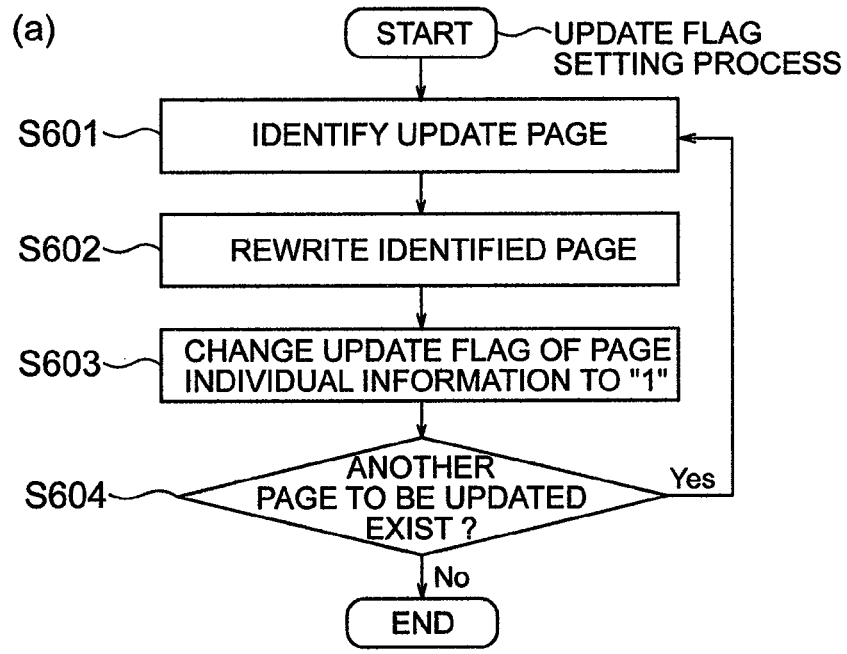
(b) 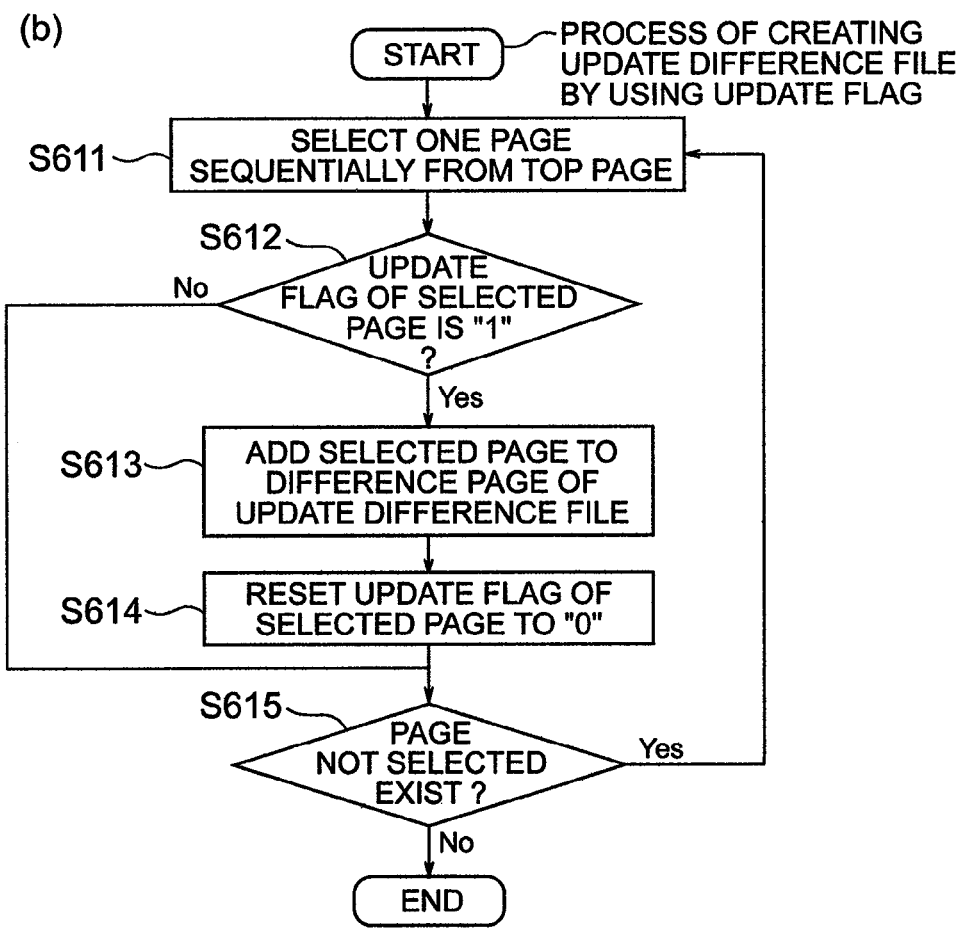

METHOD AND SYSTEM FOR DATA PROCESSING WITH DATABASE UPDATE FOR THE SAME

INCORPORATION BY REFERENCE

The present application claims priorities from Japanese applications JP2007-158143 filed on Jun. 15, 2007, JP2008-145358 filed on Jun. 3, 2008, the contents of which are hereby incorporated by reference into this application.

BACKGROUND OF THE INVENTION

1. Field of the Invention

The present invention relates to a data update method, a data update system, and a terminal used by the data update system.

2. Description of the Related Art

Data update for a database (hereinafter abbreviated to DB where proper) requires resources (computer resources) such as central processing units (CPU's) and memories. A process of updating a large amount of data becomes a load of a database of a terminal having limited resources such as an embedded system.

A database in an embedded system is not managed heretofore by middleware such as a database management system, but an application in the embedded system creates processes originally.

However, original data management by the application in the embedded system is becoming difficult to have higher performance and reliability requested to the embedded system, because of large capacity and versatility of data to be processed, caused by the recent advance in storage technologies and higher functionality of the embedded system. Further, speed of product developments is becoming more important, because of intensified competition in embedded system markets.

Under these circumstances, recognition prevails in which productivity of software developments is enhanced by separating applications and data management not by mounting the database of a terminal in an application in the embedded system, but by adopting a high performance relational database (RDB) operating in a computer having abundant resources such as a center.

In order to operate a high performance RDB in an embedded system having a performance lower than that of the center, it is necessary to reduce processing. One example of reducing processing is to utilize log data of an update command. For example, according to the techniques disclosed in JP-A-2004-145827, when update is performed in one apparatus, the update command is recorded as log, and when update is performed in another apparatus, the log is also utilized.

SUMMARY OF THE INVENTION

However, with the conventional techniques, processing is not reduced sufficiently to the extent that RDB is operated in an embedded system.

For example, according to the conventional techniques, although the log is reused by a plurality of apparatus, each apparatus is required to execute a process of analyzing an update command (hereinafter abbreviated to an SQL update command) written by structured query language (SQL) or the like in order to adopt a log. The reason why this update command process has a high load is that an object to be calculated by the update command is a logical structure of an RDB table.

Namely, each apparatus is required to execute a process of implementing a table of a logical structure in accordance with files of a physical structure stored in the apparatus. This process has a high load.

It is therefore a main object of the present invention to solve the above-described problem and reduce a load of database processing by a computer having a performance lower than that of a center, in a system cooperating the center as a high performance computer and low performance computers.

In order to settle the above issue, the present invention provides a data update method to be executed by a database system in which a high performance center and one or more terminals having a performance lower than that of the center each have a database management system (DBMS) for managing each version by using a table of a relational database (RDB) logical structure constituted of a two-dimensional table as physical structure pages stored in a file of a disk and running a same version. The center stores a result of applying an input center side received command to the table, in a page of the file in a DB area, and creates an update difference file storing each difference page of each page in the DB area representative of a data change between a version before update and a version after update caused by the center side received command. Each terminal stores a result of applying an input terminal side received command to the table in a page of a file in a DB area, saves a version before update of the page in the DB area whose version was changed from the version before update to a version after update by the terminal side received command, in a backup file as a backup page, overwrite copies the backup page for the page subjected to a data change to the version after update by the terminal side received command, when the center side received command is issued, to thereby write back the version before update before the terminal side received command is applied, prior to data update using the update difference file, and updates to the version after update after being applied with the center side received command to thereby overwrite copy the difference page in the update difference file notified from the center to a page in a DB area of the terminal. Other means will be later described.

According to the present invention, in the system cooperating the high performance center and the terminal having a performance lower than that of the center, it is possible to reduce a load of database processing by a computer having a performance lower than that of the center.

Other objects, features and advantages of the invention will become apparent from the following description of the embodiments of the invention taken in conjunction with the accompanying drawings.

BRIEF DESCRIPTION OF THE DRAWINGS

FIG. 1 is illustrative diagrams showing the outline of a whole database system according to an embodiment.

FIG. 3 is illustrative diagrams explaining utilization of two types of update according to the embodiment.

FIG. 9 is an illustrative diagram showing a data structure of a DB area according to the embodiment.

FIG. 11 is an illustrative diagram showing the data structures of an update difference file and a backup file.

FIG. 14 is illustrative diagrams explaining three methods of creating the update difference file according to the embodiment.

FIG. 18 is flow charts illustrating a method of setting update flags outside pages, in the update difference file creating process according to the embodiment.

FIG. 19 is flow charts illustrating a method of setting update flags inside pages, in the update difference file creating process according to the embodiment.

DESCRIPTION OF THE EMBODIMENTS

Figure 2:
FIG. 2 is illustrative diagrams explaining a relation between a logical structure table and a physical structure page of RDB according to the embodiment.

An embodiment of a database system adopting the present invention will now be described in detail with reference to the accompanying drawings.

FIG. 1 shows illustrative diagrams showing the outline of a whole database system according to an embodiment. In this system, one center and one or more terminals are interconnected by a network. The center and terminals each have a database (DB) for storing data of a predetermined version. In the following, DB possessed by the center is called a center DB, and DB possessed by each terminal is called a terminal DB.

The center and terminals each are realized by a computer equipped with a storage for storing DB and a CPU for executing a control process and the like.

In FIG. 1, a version of data in DB possessed by each computer is expressed by a numerical number in an ellipsoid. For example, a center and terminals shown left in FIG. 1(*a*) (before update) each have data of a version [1.0]. Namely, data of the same content is stored in each computer.

Next, description will be made on update of two types (center side received update, and terminal side received update) paying attention to a range influenced by update.

FIG. 1(*a*) is an illustrative diagram of terminal side received update. The terminal side received update has, as its main object, update not having a large load and being able to be executed sufficiently even in an embedded system, as different from center side received update having, as its object, a large amount of data update shown in FIG. 1(*b*).

In an initial state, the center DB and terminal DB have the same version [1.0]. Of three terminals, one terminal A receives an SQL update command. Then, the terminal A reflects the SQL update command upon its terminal DB. A reflection process for the update command is executed by a DB management unit 21 (FIG. 8) of the terminal A. The version of the terminal DB of the terminal A is therefore updated from [1.0] to [1.1].

The update to the version [1.1] is the update not reflected upon another terminal and center and closed to the terminal A (in other words, local to the terminal A). The terminal side received update is independent from each DB update. Therefore, even if there are a plurality of terminals, each terminal DB is operated independently, and will not be influenced each other. In this embodiment, the terminal side received update is expressed by an increase in a decimal number of the version number.

FIG. 1(*b*) is an illustrative diagram showing center side received update. If the terminal side received update shown in FIG. 1(*a*) is performed individually at each terminal side, a load of terminal resources increases. Therefore, the center side received update is performed by a center having abundant resources, for the update common to all terminals, to thereby reduce the load of each terminal.

In an initial state, the center DB and terminal DB have the same version [1.0]. The center managing three terminals receives an input of an SQL update command. Then, the center reflects the SQL update command upon its terminal DB. A reflection process for the update command is executed by a DB management unit 11 (FIG. 8) of the center. The version of the center DB of the center is therefore updated from [1.0] to [2.0].

The update to the version [2.0] is the update reflected upon all terminals managed by the center (in other words, global to all terminals). In this specification, the center side received update is expressed by an increase in an integer number of the version number.

Description will now be made on center side received update after terminal side received update. After the terminal side received update illustrated in FIG. 1(*a*), there exist in a mixed state the DB version [1.1] of the terminal A and the DB version [1.0] of the terminals B and C. It is necessary for the update of the center DB version from [1.0] to [2.0] to be reflected upon all terminals.

First, the version of the terminals B and C before update is the same [1.0] as that of the center. Therefore, there is no problem in updating to the version [2.0] if the terminals execute a process equivalent to the update at the center.

On the other hand, the version of the terminal A before update is [1.1] different from that of the center. Therefore, even if a process equivalent to that of the center is executed, it is not possible to update the terminal DB to the version [2.0] because data before update is different. Namely, there arises a problem when two types of update (terminal side received update and center side received update) are used.

FIG. 1(*c*) is an illustrative diagram explaining a method of solving the problem when two types of updates are used. This diagram is a state transition diagram paying attention to the version of the terminal DB of the terminal A. A numerical value written in the ellipsoid is a version number.

Figure 8:
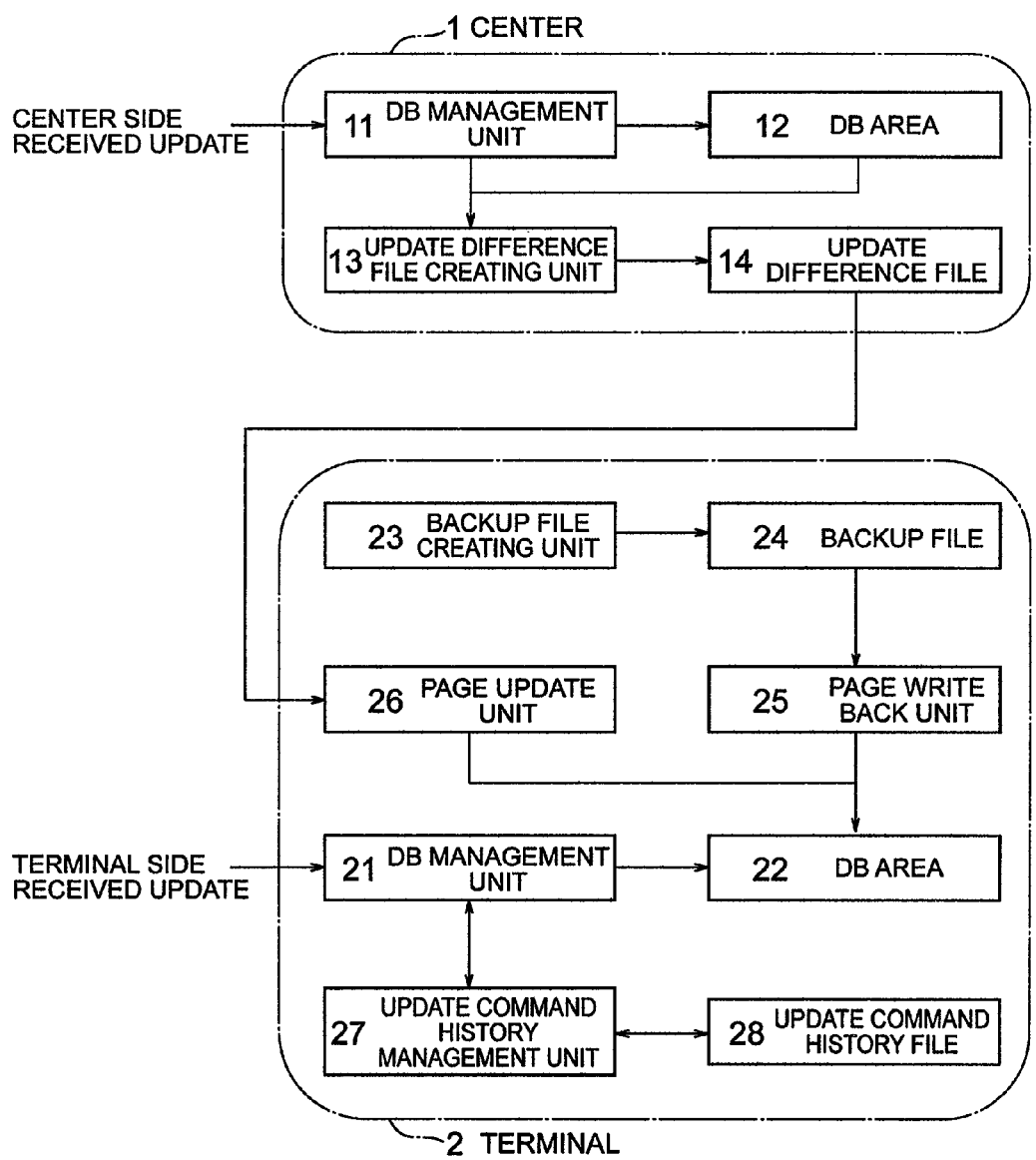
FIG. 8 is a diagram showing a functional structure of the center and terminal according to the embodiment.

First, description will be made on a state transition from [1.0] to [1.1]. The terminal DB performs the terminal side received update shown in FIG. 1(a). This terminal side received update is executed by the DB management unit 21 (FIG. 8) of the terminal A. In this case, as a page whose data is to be rewritten is identified, the page to be actually rewritten is saved as a backup file. This backup file saving (storing) process is executed by a backup file creating unit 23 (FIG. 8). If the terminal side received update is performed a plurality of times for the same pages, it is sufficient to save the backup file only once when the update is first executed for each page.

Next, description will be made on a state transition from [1.1] to [1.0]. This state transition is preparation for reflecting the center side received update from [1.0] to [2.0] shown in FIG. 1(b). In order to reflect the center side received update also upon the terminal A, it is necessary to make the version [1.1] of the terminal DB of the terminal A and the update source version [1.0] of the center B have the same version.

To this end, the version of the terminal DB of the terminal A is written back from [1.1] to [1.0]. The write back process is executed by a page write back unit 25 (FIG. 8) of the terminal A. Specifically, this write back process is realized by overwriting the [1.1] page with the backup file of the version [1.0] saved upon the state transition from the version [1.0] to [1.1].

Next, the state transition from the version [1.0] to [2.0] will be described. This state transition is a process of reflecting the center side received update from the version [1.0] to [2.0] shown in FIG. 1B upon the terminal A. The center generates difference data between the versions [1.0] and [2.0], and inputs the different data to the terminal A.

Specifically, the center compares a database of the initial state [1.0] prepared beforehand with the database of the updated [2.0] at each page, and stores a file of a page of the updated database among pages having different data. This file indicates the difference data. A process of storing the difference data is executed by an update difference file creating unit 13 (FIG. 8) of the center. A process of updating the database of the center from [1.0] to [2.0] is executed by the database management unit 11.

The terminal A input with the difference data from the center applies the difference data to the terminal DB of the version [1.0] to thereby update the version to the version [2.0]. This update process is executed by a page update unit 26 (FIG. 8) of the terminal A. In this manner, the center side received update is reflected also upon the terminal A.

The state transition from the version [2.0] to [2.1] will further be described. This state transition is a process of updating to the version [2.1] by applying the content of the terminal side received update from the version [1.0] to [1.1] to the version [2.0].

Specifically, the terminal A stores the SQL update command for the already executed terminal side received update from the version [1.0] to [1.1], and applies the SQL update command to the version [2.0] to update the version to the version [2.1]. Since the SQL update command is reused for the terminal side received update at the second time, it is possible to omit the operation of inputting a new SQL update command to the terminal. A process of storing the SQL update command is executed by an update command history management unit 27 (FIG. 8).

Namely, by updating the version to the version [2.1], it is possible to recover the content of the terminal side received update lost when overwriting the version with the version [1.0] after the center side received update process is executed.

The recoverable update content is limitative. For example, if the terminal side received update rewrites a predetermined page and this predetermined page is deleted upon the center side received update process, the terminal side received update cannot recover the content by using the version [2.1] because the predetermined page was deleted.

On the other hand, if a particular page used as the object of the terminal side received update is not influenced by the physical center side received update process in terms of a logical structure, i.e., if any row in a table is not changed, then the content of the terminal side received update can be recovered by using the version [2.1].

TABLE 1

| UPDATE ID | SQL STATEMENT | PARAMETER INFORMATION etc. |
|---|---|---|
| 2006-1223-0123 | update T1 set . . . | AAA |
| 2006-1224-0101 | delete from T1 where . . . | BBB |
| : | : | : |

Table 1 shows an example of the update command history file for SQL update commands. The update command history file stores an update ID for identifying an update order, a designated SQL statement, and an input parameter value of the SQL statement, in one-to-one correspondence. The update ID is created so as to identify the time when an SQL update command is issued. For example, an update ID "2006-1223-0123" in the first row is created in accordance with an issue time of 2006.12.23 at 01:23. By defining uniquely the order by using an update ID, SQL statement can be applied in this order.

FIG. 2 is an illustrative diagram showing a relation between a logical structure table of RDB and a physical structure page.

RDB is a most common database operated in an information system. RDB expresses a database logical structure in the create of a two-dimensional table. A horizontal direction of the table is called a row (record), and the vertical direction is called a column (field). The row is a unit when the table is processed, and is constituted of one or more columns. The same column of each row stores data of the same format.

In RDB, data processing is performed by designating a table and a row to be processed, by using a SQL statement. In processing data in the database, a user of RDB is required only to be conscious of the logical structure of rows and columns of the table two-dimensionally disposed.

Namely, the user is not required to be conscious of the physical structure where and in what format the data is stored in a physical structure file storing the table. Correspondence between the logical structure and physical structure is made by a database management system which is middleware.

Data in the database to be accessed is expressed as a logical structure table. A DB area storing this table is constituted of one or a plurality of files stored in a physical area, as viewed from an operation system.

If the DB area is constituted of a plurality of files, it is sufficient if an operation such as update in the DB area is performed for each of a plurality of files constituting the DB area. A file is partitioned in the unit of a page having a fixed size (also called a segment). Data processing of the physical structure is performed for each page.

FIG. 2(a) shows a table before update. The table is expressed by a two-dimensional table format using rows and columns as axes. An update command written in an SQL format can be applied to this table. Although description will be made by paying attention to a partial area of one table, the DB area may store a plurality of tables.

FIG. 2(b) shows the same data as that in the table shown in FIG. 2(a), and shows a page to be stored in the DB area. For example, the page stores the data constituting the table in a sequential order. The update command written in an SQL format cannot be applied to the page. In FIG. 2(b), although description is made by extracting one page, one table may store a plurality of consecutive pages.

FIG. 2(c) shows a table after update by applying an SQL update command to the table shown in FIG. 2(a). A value of the second column of each row is updated to "999-999" by an SQL update command of "selecting records having the first column "11" and changing the second column of the selected records to "999-999".

Upon reception of an SQL data update command, the database management system executes identification of a corresponding page and identification of a corresponding area in the identified page. First, identification of a corresponding page is to identify a page where the table designated by the SQL update command is stored, and in other words, is to transform the logical structure into the physical structure.

Second, identification of a corresponding page in the identified page is, for example, to confirm whether a value of the first column of each row in the corresponding page is "11", and when a row having the value "11' is found, to rewrite a filed storing the second column of the row with the value "999-999". The update process for RDB has therefore an overhead of identifying the corresponding page and the corresponding area in the identified page.

FIG. 2(d) shows the same data as that in the table shown in FIG. 2(c), and shows a page to be stored in the DB area. As compared to the table shown in FIG. 2(b), the areas corresponding to the second column data is rewritten with "999-999".

The characteristics of this specification reside in that logical update is performed at a first time, and physical update is performed at a second and succeeding times by utilizing the result of the logical update.

First, the logical update is a process of, when the page before update shown in FIG. 2(b) is updated to the page after update shown in FIG. 2(d), converting the page into the table (a solid line arrow in the drawing sheet: FIG. 2(b)→FIG. 2(a)), applying the SQL update command to the converted table, and converting the table applied with the command into the page (a solid line arrow in the drawing sheet: FIG. 2(c)→FIG. 2(d)). Namely, since this update method uses a logical structure table, the process is called logical update.

On the other hand, the physical update is a process of, when the page before update shown in FIG. 2(b) is updated to the page after update shown in FIG. 2(d), copying (overwriting) the page after update to the DB area where the page before update is stored. Namely, since the update method uses the physical structure page itself without using the logical structure table, the process is called physical update.

The physical update includes page update for updating (version up) the page before update to the page after update, and page write back for writing the page after update back to the page before update. Any of the physical update has as a computer process only data copy to the storage without analysis of SQL so that high speed processing is possible. Namely, there is no overhead of conversion from the logical structure generated by the SQL update process into the physical structure, and it is possible to estimate an update time approximately as a disk input/output time.

In conventional data update for a terminal having a performance lower than that of the center, such as an embedded system, logical update has been applied to all update. In this case, it is difficult to complete the update process for a large amount of data in a time allowable to the system. This is because an overhead is generated for conversion from the logical structure into the physical structure in RDB data update.

An embedded system, particularly, a consumer side embedded system, has a larger limit of resources such as usable CPU's and storages than an enterprise based server or the like, because factors of cost and consumption power. Therefore, the overhead influences greatly the performance of the system.

In the method of solving the problem to be caused by utilizing two types of update shown in FIG. 1(c), a high speed update process can be realized by properly adopting the logical update and physical update shown in FIG. 2. The details of the high speed update process will be described hereunder.

First, logical update is applied to the terminal side received update of the version [1.0]→[1.1]. This is because this update is a first operation of analyzing the input SQL update command.

Next, for the write back of the terminal side received update of the version [1.1]→[1.0], the page write back of the physical update is adopted by using a backup file as an update source page. Since this process is the physical update, high speed processing is possible.

For the center side received update of the version [1.0]→[2.0], the center adopts the logical update, and each terminal adopts the physical update. On the center side, since the update is a first operation of analyzing the input SQL update command, the logical update is performed. Each terminal performs page update of the physical update utilizing the result of the first logical update. Since this process is the physical update, high speed processing is possible.

For the terminal side received update of the version [2.0]→[2.1], the logical update is adopted. This is because the physical update cannot be adopted since the input SQL update command is required to be analyzed.

As described above, since the physical update can be adopted when the center side received update is reflected upon each terminal, high speed processing is possible. Further, if the terminal is structured based on a specification that the terminal side received update does not occur, the function of analyzing an SQL update command is not provided, and all update is processed by the physical update so that a compact and high speed apparatus can be realized.

FIG. 3 shows illustrative diagrams explaining utilizing two types of update. FIG. 3(a) shows eight pages before update. FIG. 3(b) shows pages after the terminal side received update is performed for pages C and D, relative to FIG. 3(a). The version number of the updated pages C and D is [1.1].

FIG. 3(c) shows a state that center side received update [pages B, D, G and H] is applied without executing a pre-process of page write back, in the state shown in FIG. 3(b). Although the pages B, D, G and H are updated to a version [2.0], the page C continues to have the version [1.1] because the page C is not a target of the center side received update. However, the page C of the center DB has a version [1.0] because the terminal side received update is not performed so that there is a mismatch with the data of the terminal DB shown in FIG. 3(c).

FIG. 3(d) shows a state that center side received update [pages B, D, G and H] is adopted after executing a pre-process of page write back, in the state shown in FIG. 3B. The page C returns to the version [1.0] by the page write back process. The content of the page C is therefore coincident with that of the page C of the center DB, and mismatch can be eliminated.

Figure 4:
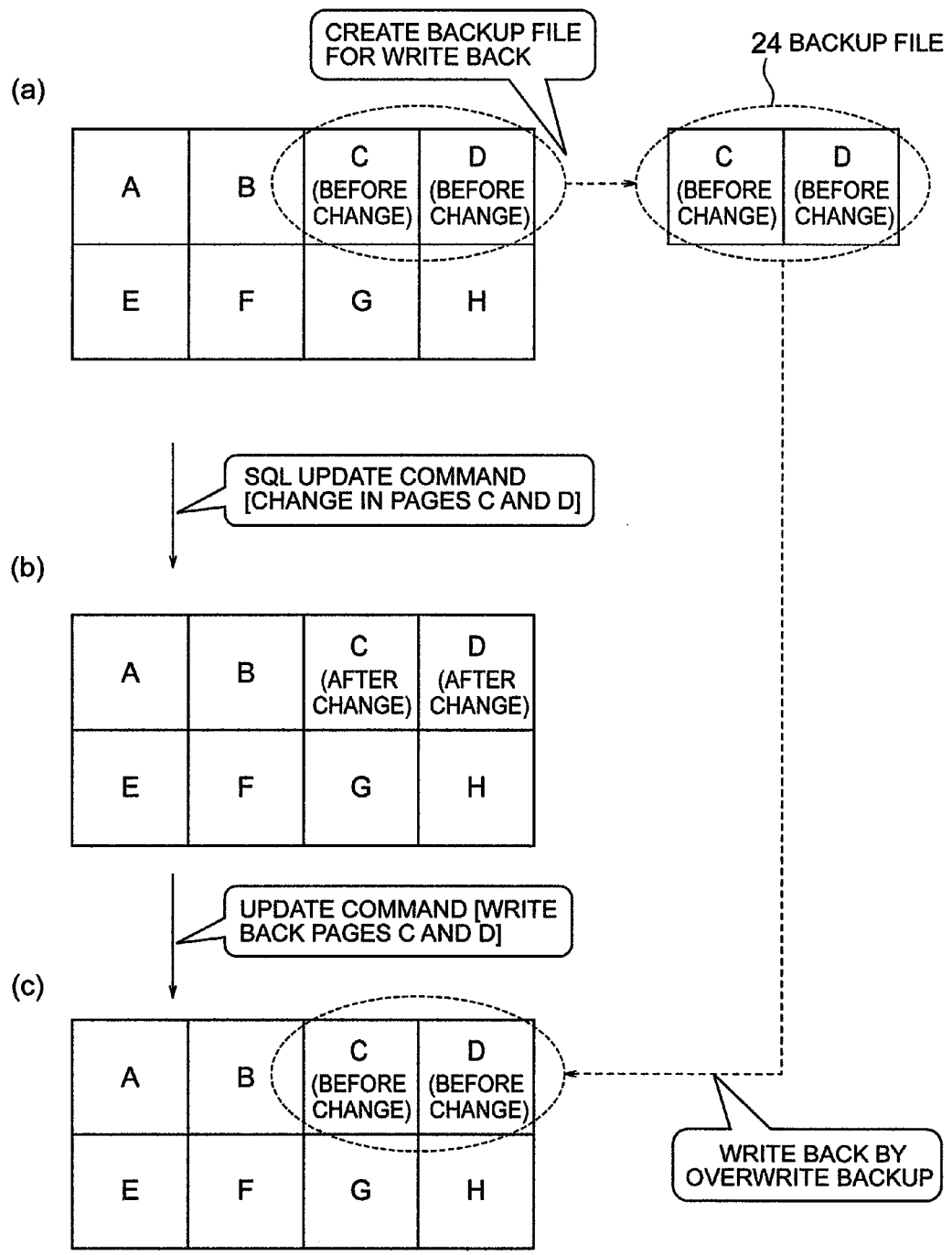
FIG. 4 is illustrative diagrams explaining a backup file according to the embodiment.

FIG. 4 shows illustrative diagrams explaining a backup file to be used for center side received update (version [1.0]→[1.1]) and its write back (version [1.1]→[1.0]).

The backup file 24 is a file for saving pages before update to be updated when the terminal side received update is executed. However, saving the pages before update is performed once per each page, and only when each page is first updated.

FIG. 4(a) shows saving pages to be updated in a backup file 24 when an instruction of the terminal side received update is acknowledged. It is assumed that an SQL update command is received influencing two pages (pages C and D) among eight pages (pages A to H). Two pages to be updated are copied and saved in the backup file 24, before the two pages are updated.

FIG. 4(b) shows pages after an instruction of the terminal side received update is executed and pages are updated. Two pages (pages C and D) among the eight pages (pages A to H) are changed.

FIG. 4(c) illustrates page write back for preparation when an instruction of a center side received update is acknowledged. High speed page write back is realized by overwriting the two pages (pages C and D) saved in the backup file 24 shown in FIG. 4(a) to corresponding areas.

Figure 5:
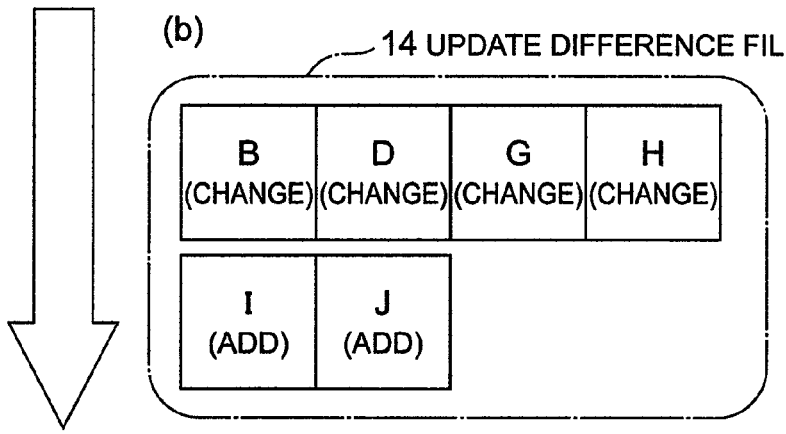
FIG. 5 is illustrative diagrams explaining an update difference file according to the embodiment.

FIG. 5 shows are illustrative diagrams explaining an update difference file. This update difference film 14 extracts a difference of each page rewritten (page addition, page deletion, and page content change) by the update process from a page before update to a page after update.

The update difference file 14 is notified from the center executed the center side received update to each terminal. Since this notice uses only a difference, the data amount can be made smaller as compared to notifying all pages including pages not updated.

Of eight pages shown in FIG. 5(a), four pages (pages B, D, G and H) are changed and two pages (pages I and J) are added. The update difference file shown in FIG. 5B is notified from the center to each terminal, and each terminal reflects the notified update difference file upon its terminal DB. In this manner, the terminal DB is updated as shown in FIG. 5(c).

Figure 6:
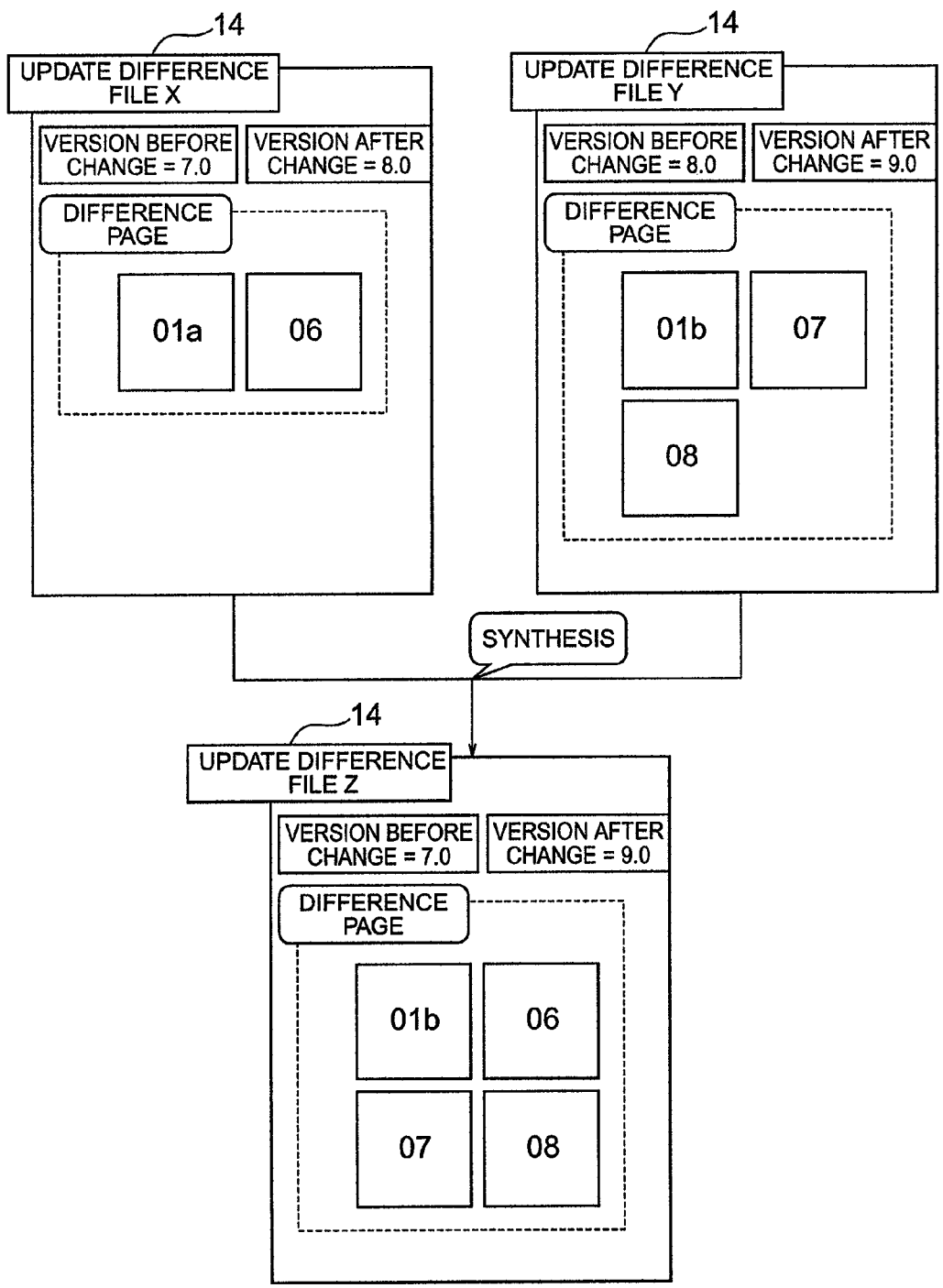
FIG. 6 is an illustrative diagram explaining a synthesis process for update difference files according to the embodiment.

FIG. 6 is an illustrative diagram explaining a synthesis process for update difference files. A plurality of update difference files 14 can be synthesized into one update difference file 14, in accordance with the version numbers. For example, an update difference file 14X is used for update of a version [7.0]→[8.0], and an update difference file 14Y is used for update of a version [8.0]→[9.0]. Since the version [8.0] of the update difference file 14X after update is coincident with the version [8.0] of the update difference file 14Y before update, both the files can be synthesized.

The update difference file 14X has difference pages 01a and 06. The update difference file 14Y has difference pages 01b, 07 and 08. The pages 01a and 01b are data to be stored in the same page 01.

An update difference file 14Z has a set of pages (pages 06, 07 and 08) contained in either the update difference file 14X or the update difference file 14Y. Further, the update difference file 14Z contains the page 01b of the update difference file 14Y having a newer (larger) version number among the pages (pages 01a and 01b) in the same page of the update difference files 14X and 14Y.

With this analysis process for the update difference files 14, the center is not necessary to hold the DB areas of all versions so that the disk size can be economized. The latest version after update (e.g., [8.0] of the update difference file 14X) of the already created update difference files 14 is used as the version before update of the newly created update difference file 14Y. Therefore, since the difference amount is allowed to be small, the update difference file 14Z can be created at high speed.

For example, if an update difference file 14 for updating to a DB area having a version number separated by two versions or more, such as update from the version [7.0] to [9.0], becomes necessary, update difference files 14Z for the version [7.0]→[8.0] and the version [8.0]→[9.0] are synthesized.

Further, if update source versions of the terminals are still not synthesized, the center synthesizes the update difference file 14 for the update source versions. A method of acquiring the update source version by the center includes a method by which the center side holds the update source version of each terminal or a method by which an update source version is notified from each terminal.

Figure 7:
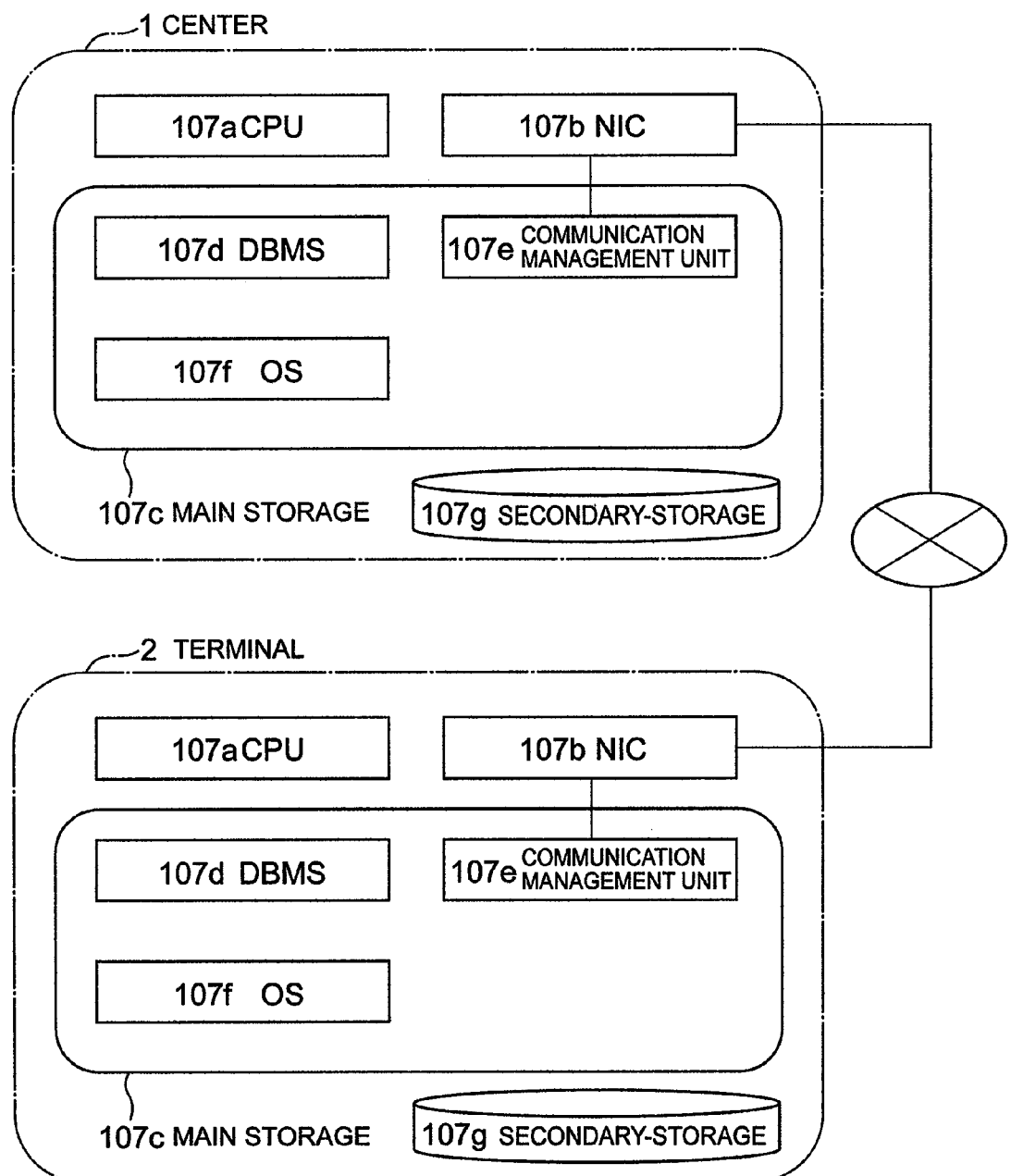
FIG. 7 is a diagram showing a hardware structure of a center and terminal according to the embodiment.

FIG. 7 is a diagram showing the structure of hardware of a computer constituting each of the center and terminals. The computer has a CPU 107a, a network interface card (NIC) 107b, a main storage 107c such as a random access memory (RAM) and a secondary storage 107g such as a hard disk drive (HDD).

CPU 107a executes an operating system (OS) 107f and an application program on the main storage 107c to realize a data base management system (DBMS) 107d. DBMS 107d performs data communications with another apparatus via NIC 107b by using the communication management unit 107e.

Data transfer between the center and each terminal may be performed by using a storage medium, instead of realizing a communication process utilizing a data communication line of a network via NIC as shown in FIG. 7. For example, data output (such as update difference file) from the center is written in a storage medium such as a digital versatile disc-read only memory (DVD-ROM), and as the storage medium is inserted into the terminal, the terminal reads data from the storage medium to input the read data.

FIG. 8 is a diagram paying attention to the functional units of the computer constituting each of the center 1 and terminal 2. Each functional unit is mounted inside or outside DBMS 107d of the main storage 107c shown in FIG. 7.

The center 1 has a DB management unit 11, a DB area 12, an update difference file creating unit 13 and an update difference file 14. The terminal 2 has a DB management unit 21, a DB area 22, a backup file creating unit 23, a backup file 24, a page write back unit 25, a page update unit 26, an update command history management unit 27 and an update command history file 28.

Upon reception of an SQL process request relative to the DB areas 12 and 22, the DB management units 11 and 21 mounted inside DBMS perform the data processing for the request relative to the DB areas. The SQL process request has a format for designating a logical structure table and its row. The DB management unit 11 of the center 1 processes center side received update, and the DB management unit 21 of the terminal 2 processes terminal side received update.

The DB areas 12 and 22 are storage areas for storing pages such as shown in FIGS. 3A to 3D. When data processing relative to the logical structure table is to be executed, the DB management units 11 and 21 convert the data processing relative to logical structure table into data processing relative to the physical structure page in the DB areas 12 and 22, and execute the latter data processing.

The update difference file creating unit 13 creates the update difference file 14 shown in FIG. 5(b). The backup file creating unit 23 creates the backup file 24 shown in FIG. 4(a).

The page write back unit 25 and page update unit 26 execute the physical update described with reference to FIGS. 2(*b*) and (*d*), respectively.

The update command history management unit 27 records the SQL update command for the "(1) terminal side received update request" shown in FIG. 1(*c*) in the update command history file 28, and thereafter notifies the request to the DB management unit 21. When the "(4) terminal side received update request" shown in FIG. 1(*c*) is to be executed again, the update command history management unit reads the SQL update command from the update command history file 28, and notifies the request to the DB management unit 21.

FIG. 9 is an illustrative diagram showing the data structure of the DB area in a tree structure. A root direction of the tree is disposed left. A multiplicity degree is set between nodes. For example, one DB area 12 is constituted of one piece of page management information and one or more pieces of page individual information The page management information is information on one table. As described earlier, although one table is stored in one or more pages, the page management information is information common to each page. The number of pages is the number of pages constituting the table. A page size indicates a capacity of a fixed length page to be stored in a disk. A deletion page number is a page number of the deletion start page of pages after a predetermined page number, to be deleted from the DB area before update.

The page individual information is information on each page. The page number indicates a position of the page in the DB area.

An update flag sets whether the DB area 12 of the center 1 is updated (value "1") or not (value "0"). An update flag array disposes update flags collectively. Since update flags for the number of pages and one update flag array indicate the same content, it is sufficient that one of the update flags for the number of pages or the update flag array is configured. Page data indicates the data content of the page. Values of the update flag array or the update flags are referred to when the update difference file 14 is created. After the update difference file 14 is created, the values are cleared to "0".

A difference between the DB areas 12 and 22 resides in that the update flag of the DB area 12 is changed to a backup flag of the DB area 22. The backup flag sets, when a page is updated, whether the page is saved in the backup file 24 (value "1") or not (value "0").

In the first operation of a page update process, a backup flag corresponding to a page to be backed up is changed from a value "0 (not backed up)" to a value "1 (backed up). In the second and succeeding operations, a backup flag corresponding to the page to be backed up is referred to, and if the value is "1", the backup process is omitted. When the backup file 24 is utilized for the write back process, the value may be returned to the value "0" and the unnecessary used backup file 24 may be deleted.

Figure 10:
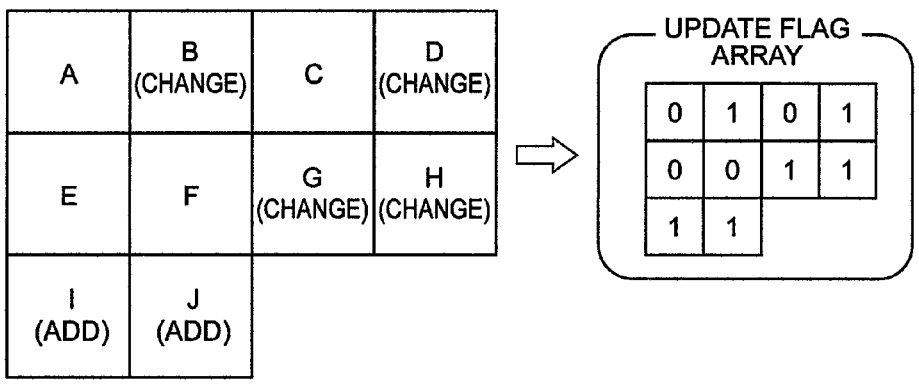
FIG. 10 is illustrative diagrams showing update flags and an update flag array according to the embodiment.

FIG. 10 is illustrative diagrams showing the update flags and update flag array described with reference to FIG. 9. It is assumed that update is performed for six pages (pages B, D, G, H, I and J) among eight pages shown in FIG. 10(*a*). FIG. 10(*b*) shows the update flag array collectively showing a presence/absence of update, and FIG. 10(*c*) shows an update flag representative of a presence/absence of update, separately disposed at upper left of each page.

FIG. 11(*a*) shows a data structure where the update difference file 14 shown in FIG. 5B is stored. One update difference file 14 is constituted of one piece of version information, one piece of page management information and one or more difference pages.

The version information is constituted of a pair of a version before update and a version after update. The version information is constituted of information on a version number, a creation date and the like.

The page management information is information common to the difference pages stored in the update difference file 14. The page management information is constituted of the number of pages stored in the update difference file 14, a page size of the stored pages, and a top page number of pages to be deleted from the target DB area during a physical center side received update process.

The difference page is a page in the DB area after update. The difference pages are disposed in the page number order. By sequentially copying the difference pages to the update destination DB area, a transfer amount to the disk can be minimized so that the performance of the update process can further be improved. Each difference page is correlated to the page number indicating the location to be disposed. Therefore, in the update process of the DB area of the terminal, it is sufficient if the update page is copied to the location designated by the page number.

FIG. 11(*b*) shows a data structure where the backup file 24 shown in FIG. 4A is stored. One backup file 24 is constituted of one piece of backup management information and one or more backup pages. The backup page indicates the page content before update saved from the DB area.

The backup management information contains an free space, a page size, the number of pages, and new page assignment information. The free space is a field where the free space of the backup file 24 is stored. The number of pages is a field where the number of backup pages in the backup file is stored.

The page size is a field for storing the size (page size) of the backup page stored in the backup file. The number of pages is a field for storing the number of backup pages in the backup file.

The new page assignment information is a field for storing information on a new page additionally assigned by expanding the DB area during the DB area updating process. The assignment flag is a flag representative of whether a new page is added (value "1") or not (value "0"). The start position indicates a page number indicating the start position of the added new page. The number of pages is the number of added new pages.

Figure 12:
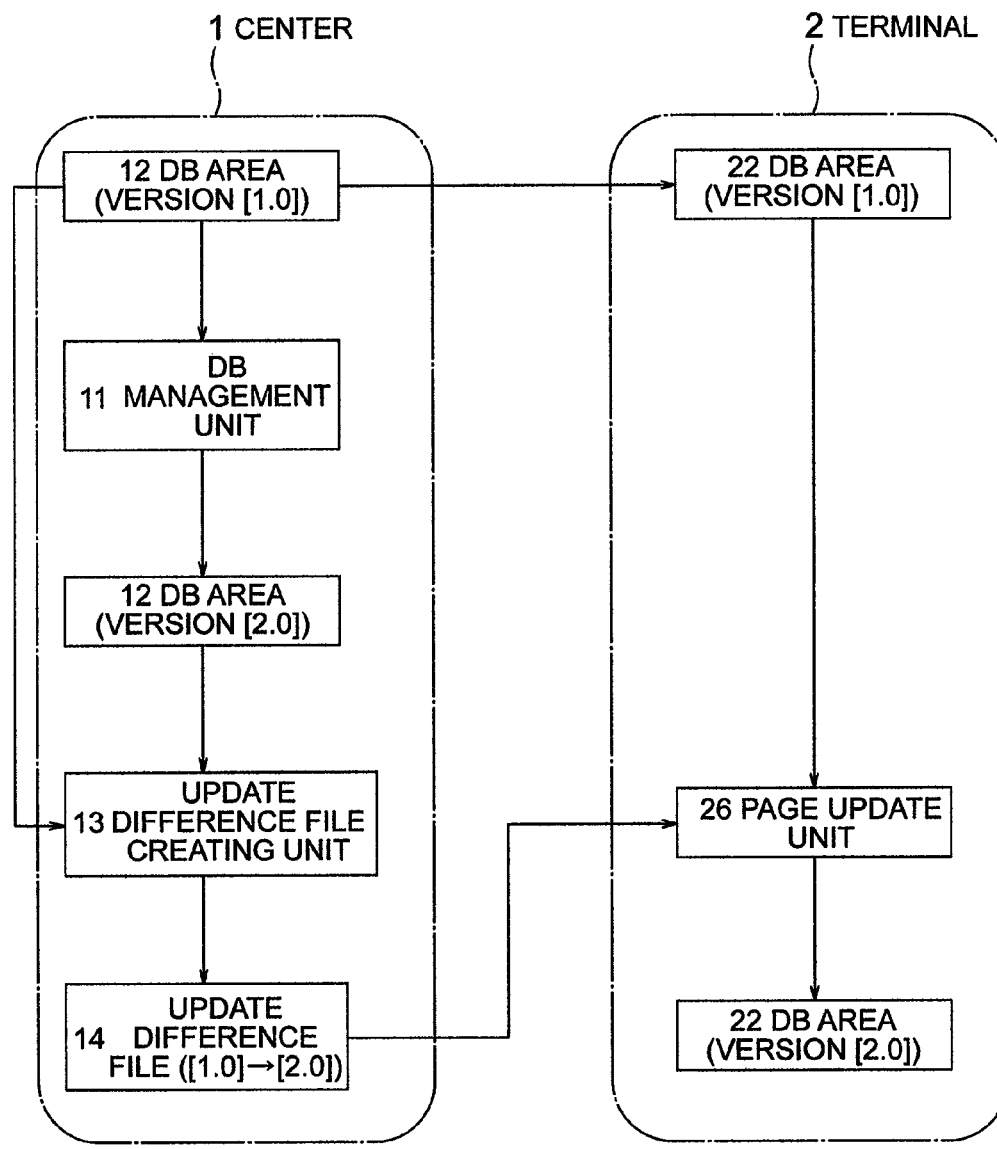
FIG. 12 is an illustrative diagram explaining the operation of center side received update according to the embodiment.

FIG. 12 is an illustrative diagram explaining the operations of the center 1 and terminal 2 when the "(3) center side received update" shown in FIG. 1(*c*) is executed. The terminal side received update is not performed in FIG. 12, and description will be made assuming that the center 1 and terminal 2 have the same version before update. For example, the terminals B and C shown in FIG. 1(*a*) correspond to the description of FIG. 12.

The DB area 22 of the terminal 2 establishes identification of the content of the DB area 12 of the center 1 each time a predetermined period or longer lapses. The terminal 2 creates the DB area 22 as a copy of the DB area 12 at a timing such as a factory shipping time. The state of the DB area 22 at this time is set to a version [1.0].

The DB management unit 11 of the center 1 repeats the center side received update relative to the DB area 12, and freezes the update once at a proper stage. The state of the DB area 12 at this time is set to a version [2.0]. The update difference data creating unit 13 of the center 1 extracts the update difference file 14 between the versions [1.0] and [2.0].

For example, the difference data creating unit 13 compares the version [1.0] saved beforehand with the latest version

[2.0], for each page, and has the page of the version [2.0] having a difference in the update difference file 14.

Upon reception of the update difference file 14 from the center 1, the page update unit 26 of the terminal 2 overwrites the page in the update difference file to the corresponding page in the DB area 22. With this process, the version of the center 1 and terminal 2 have the same version [2.0].

Figure 13:
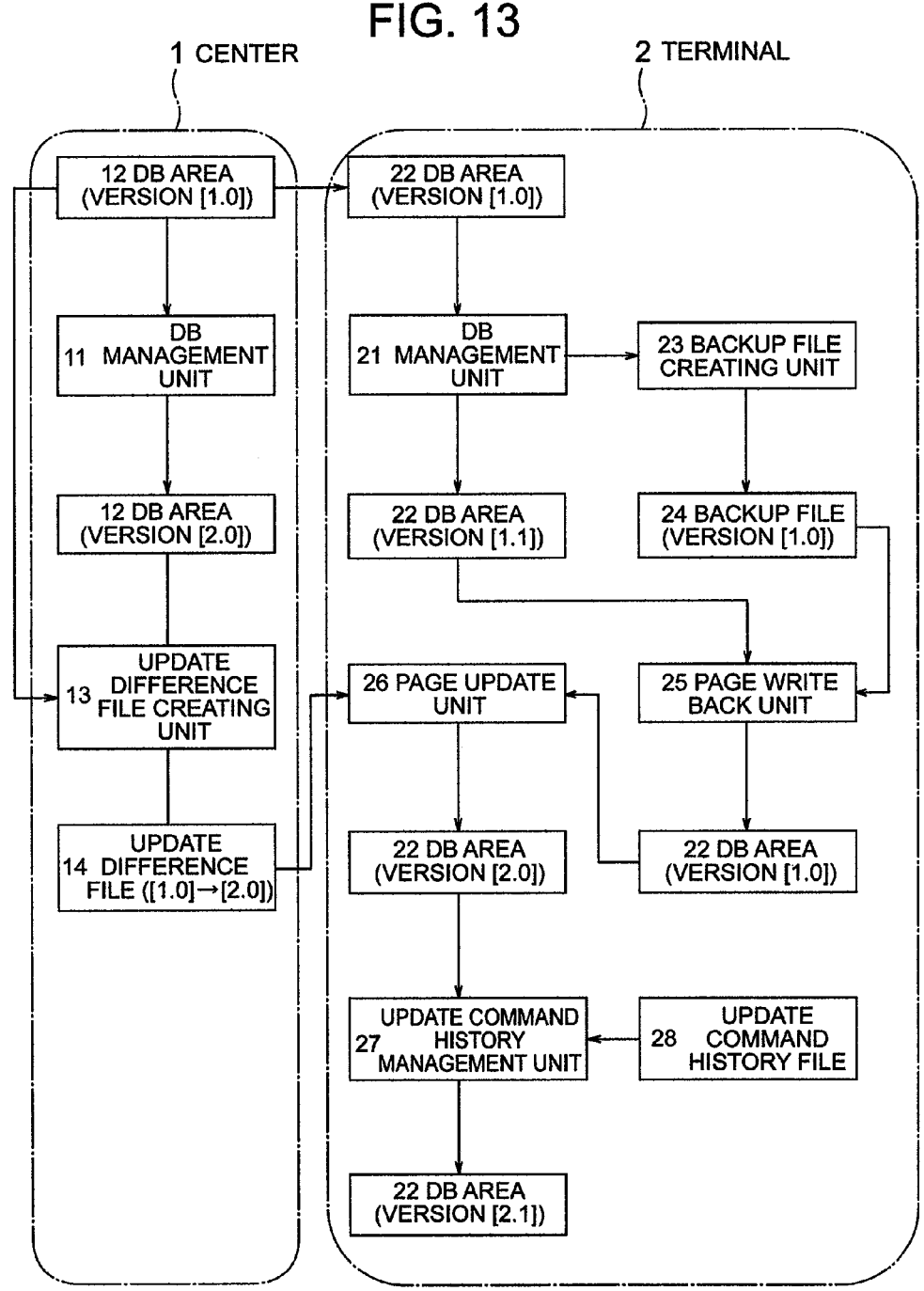
FIG. 13 is an illustrative diagram explaining the operation when a terminal side received update to re-execution of the terminal side received update are sequentially executed according to the embodiment.

FIG. 13 is an illustrative diagram explaining the operations of the center 1 and terminal 2 when sequentially executing the "(1) terminal side received update" to again the "(4) terminal side received update" in FIG. 1(*c*). In FIG. 13, description will be made on inconsistency of versions before update between the center 1 and terminal 2 to be caused by the terminal side received update. For example, the terminal A shown in FIG. 1(*a*) corresponds to the description of FIG. 13.

First, as described with reference to FIG. 12, it is assumed that the version of the DB area 12 of the center 1 and the DB area 22 of the terminal 2 is [1.0].

The DB management unit 21 of the terminal 2 executes the "(1) terminal side received update". Specifically, upon reception of the SQL update command, the DB management unit performs data processing corresponding to the command relative to the DB area 22 to update the version to the version [1.1]. In this case, the backup file creating unit 23 saves the pages of the version [1.0] in the backup file 24 before update to the version [1.1] is executed. The page having the backup flag of "1" is not necessary to be backed up in duplicate because this page has already been backed up.

The page write back unit 25 of the terminal 2 executes the "(2) write back for the terminal side received update". Specifically, by overwriting the backup file 24 of the version [1.0] to the DB area 22 updated to the version [1.1], the version is written back to the version [1.0]. Therefore, the center 1 and terminal 2 have the same version before update.

As described with reference to FIG. 13, the center 1 executes the "(3) center side received update". Therefore, the DB area 22 is updated from the version [1.0] to the version [2.0].

The update command history management unit 27 of the terminal 2 records the SQL update command for the "(1) terminal side received update" in the update command history file 28, and the DB management unit 21 is made to execute again the update command history file 28 to execute the "(4) re-execution of the terminal side received update". As a result, the DB area 22 is updated from the version [2.0] to the version [2.1].

FIG. 14 explains three methods for the update difference data creating unit 13 of the center 1 to create the update difference file 14. By adopting any one of the three methods, the update difference file 14 can be created.

FIG. 14(*a*) illustrates a full text comparison method without using update flags.

The update difference data creating unit 13 saves all data in the DB area before update (version [1.0], and does not execute any operation when the SQL update command is applied. When the update difference file 14 is created, the update difference data creating unit 13 compares all data before and after update, and extracts inconsistent pages to create the update difference file 14.

With this method, processes will not be generated when the SQL update command is applied so that throughput of the SQL update command can be improved. Further, since it is not necessary to use update flags, a simple data structure is sufficient so that influence of extension upon the already existing system can be mitigated.

FIG. 14(*b*) illustrates a method of setting update flags outside pages in the DB area. When the SQL update command is applied, the update difference data creating unit 13 sets an update flag corresponding to the updated page to the update flag array outside pages (refer to FIG. 10(*b*)). When the update difference file 14 is created, the update difference data creating unit 13 extracts pages after update set with update flags to create the update difference file 14.

With this method, a page to be updated is identified by reading the update flag array, and it is unnecessary to access the data content of the page so that the update difference file 14 can be created at high speed. Since the update flag array is disposed at one location, a disk access can be executed at high speed. Furthermore, it is not necessary to save all data in the DB area before update (version [1.0]) so that a disk capacity can be economized.

FIG. 14(*c*) illustrates a method of setting update flags inside pages in the DB area. A different point from FIG. 14(*b*) resides in that update flags (refer to FIG. 10(*c*)) set in the pages are used instead of the update flag array.

With this method, in addition to economizing the disk capacity described with reference to FIG. 14(*b*), since the update flag is buried as information of the page unit, additional data is not required to be created as in the case of the update flag array, it is possible to reduce a change amount from the already existing system and reduce development cost.

Figure 15:
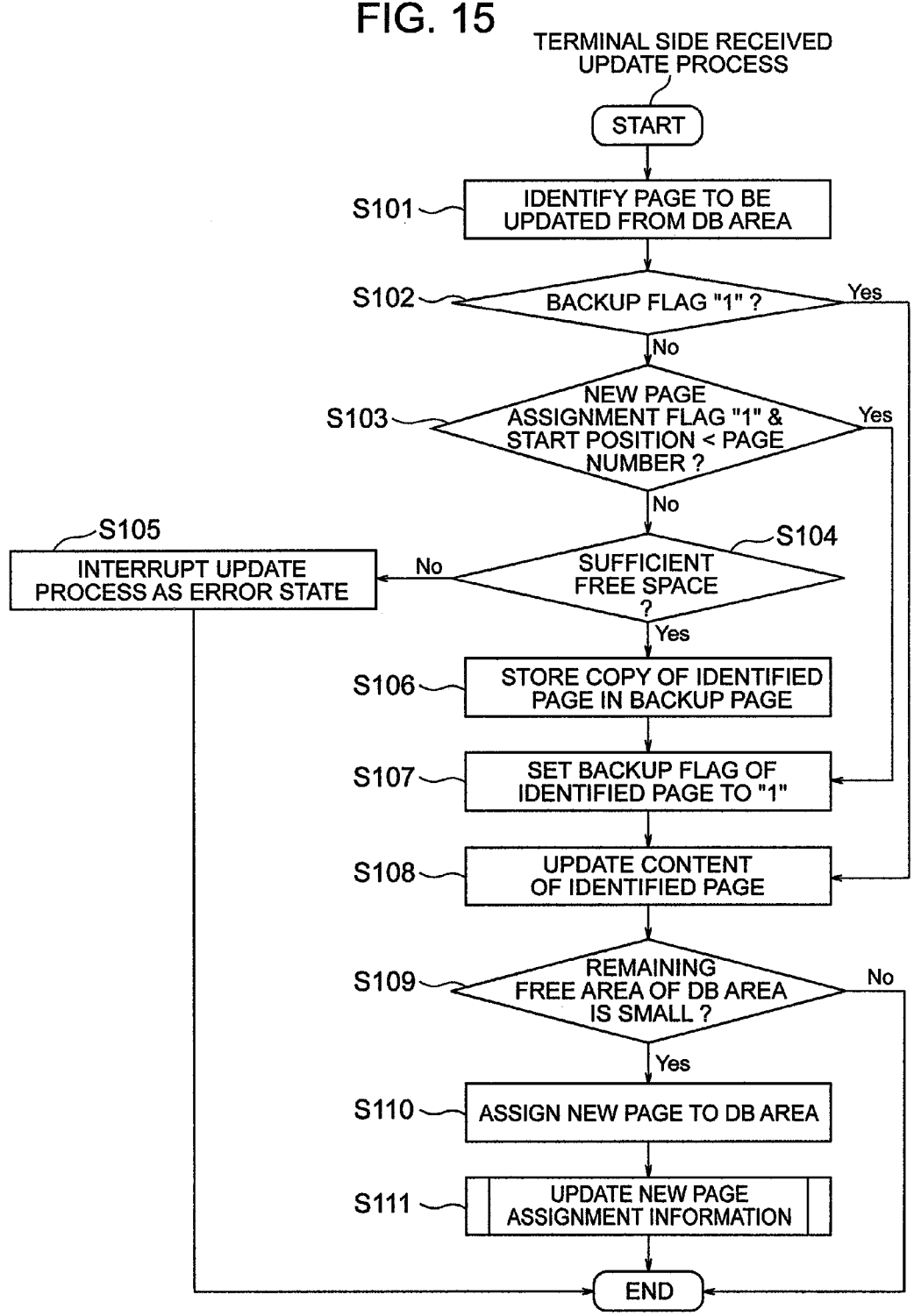
FIG. 15 is a flow chart illustrating a terminal side received update process according to the embodiment.

FIG. 15 is a flow chart illustrating the terminal side received update process to be executed by the DB management unit 21 of the terminal 2.

First, upon reception of the SQL update command, a page to be updated is identified from the DB area (S101). Next, it is judged whether a backup flag of the identified page is "1" (S102). If Yes at S102, the flow advances to S108, whereas if No, the flow advances to S103.

It is then judged whether a new page assignment flag in the backup file is "1" and a start position of the new page assignment information in the backup file is smaller than the page number of the identified page (S103). If Yes at S103, the flow advances to S107, whereas if No, the flow advances to S104.

It is further judged whether an free space in the backup file is sufficient (S104). If Yes at S104, the flow advances to S106, whereas if No, the flow advances to S105. The update process is set to an error state to intercept (S105) and terminate the process.

If Yes at S104, a copy of the identified page is stored in the backup page in the backup file (S106). The backup flag of the identified page is set to "1" (S107). The content of the identified page is updated (S108).

It is then judged whether the remaining empty in the DB area is small (S109). If Yes at S109, the flow advances to S110, whereas if No, the process is terminated. If Yes at S109, a new page is assigned to the DB area (S110), and the new page assignment information is updated (S111) to thereafter terminate the process.

Figure 16:
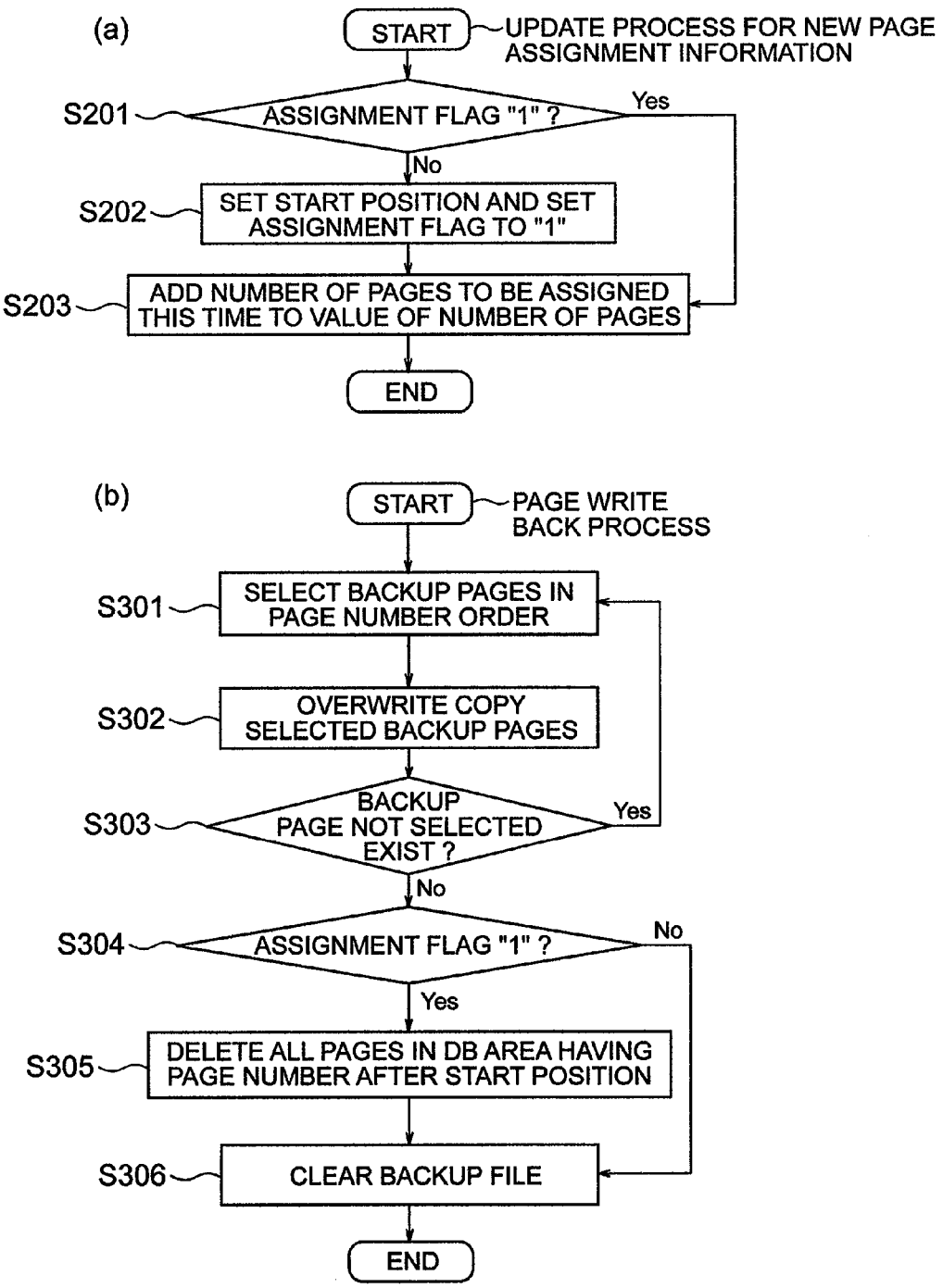
FIG. 16 is flow charts illustrating a backup file update process and a page write back process using the backup file according to the embodiment.

FIG. 16(*a*) is a flow chart illustrating the backup file update process to be executed by the backup file creating unit.

First, it is judged whether an assignment flag of new page assignment information in the backup file is "1" (S201). If Yes at S201, the flow advances to S203, whereas if No, the flow advances to S202. Next, a start position is set for the new page assignment information in the backup file, and the assignment flag is set to "1" (S202). The number of pages to be assigned this time is added to the value of the number of pages in accordance with the new page assignment information in the backup file (S203).

FIG. 16(*b*) is a flow chart illustrating a page write back process using the backup file to be executed by the page write back unit.

First, a backup page is selected from the backup file in the page number order (S301). Next, the selected backup page is overwrite copied to the page having the same page number in the DB area (S302).

It is then judged whether there is a backup page still not selected in the backup file (S303). If Yes at S303, the flow returns to S301, whereas if No, the flow advances to S304. It is also judged whether the assignment flag in the backup file is "1" (S304). If Yes at S304, the flow advances to S305, whereas if No, the flow jumps to S306.

All pages in the DB area having the page number of the start position in the backup file and succeeding page numbers are deleted (S305). Further, the backup file is cleared, i.e., an free space is set to the file size, the number of pages is set to "0", and the new page assignment information is cleared to "0" (S306).

Figure 17:
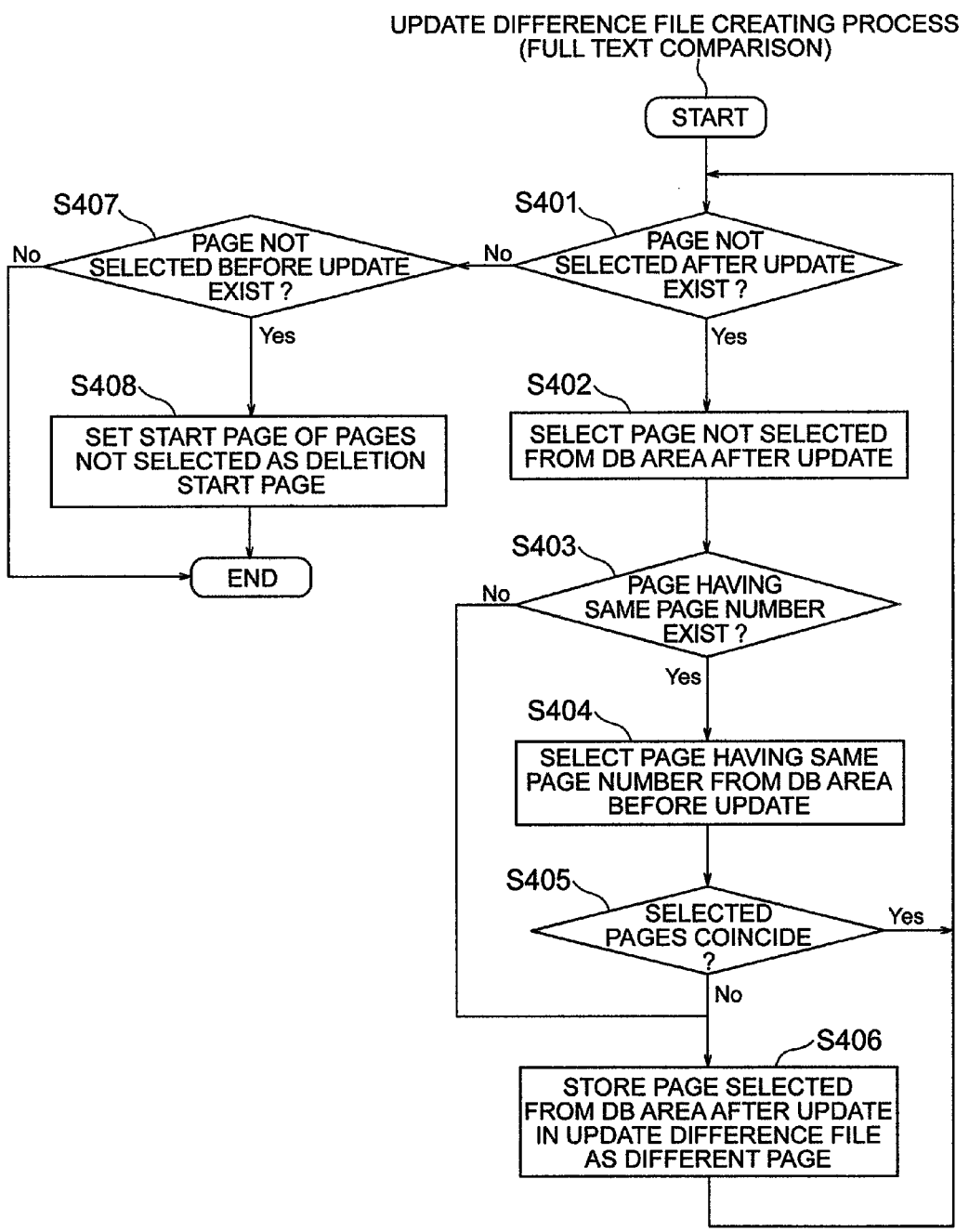
FIG. 17 is a flow chart illustrating a full text comparison method without using update flags, in a update difference file creating process according to the embodiment.

FIG. 17 is a flow chart illustrating a full text comparison method (refer to FIG. 14(a)) without using update flags in the update difference file creating process to be executed by the update difference file creating unit.

First, it is judged whether there exists a page still not selected in the DB area after update (S401). If Yes at S401, the flow advances to S402, whereas if No, the flow advances to S407. Next, a page still not selected is selected from the DB area after update (S402). It is then judged whether the page having the same page as that of the selected page after update exists in the DB area before update (S403). If Yes at S403, the flow advances to S404, whereas if No, the flow jumps to S406.

A page having the same page number is selected from the DB area before update (S404). It is then judged whether the content of the selected page before update and the content of the page after update are coincident (S405). If Yes at S405, the flow returns to S401, whereas if No, the flow advances to S406. The page selected from the DB area after update is stored in the update difference file as the difference page (S406) to thereafter return to S401.

If No at S401, it is judged whether a page still not selected exists in the DB area before update (S407), and if Yes at S407, the first page of pages not selected is set as a deletion start page (S408).

FIG. 18(a) is a flow chart illustrating an update flag setting process to be executed by the DB management unit upon update, in the update difference file creating process, for execution of the method (refer to FIG. 14(b)) of setting update flags outside pages.

First, the update page is identified (S501), and the identified page is rewritten (S502). A bit corresponding to the page number of the identified page, in the update flag array disposed outside pages, is changed to "1" (S503). If there is another page to be updated (Yes at S504), the flow returns to S501 to process the page to be updated.

FIG. 18(b) is a flow chart illustrating an update difference file creating process to be executed by the update difference file creating unit based upon the update flag set in FIG. 18(a) in the update difference flag setting process.

First, if a bit having a value "1" does not exist in the update flag array (No at S511), the process is terminated. Next, from an array position of the bit having the value "1" in the update flag array, a corresponding page number is obtained (S512). The rewritten page having the obtained page number is extracted from the DB area, and this page is added to the difference page in the update difference file (S513) to thereafter return to S511.

FIG. 19(a) is a flow chart illustrating an update flag setting process to be executed by the DB management unit upon update, in the update difference file creating process, for execution of the method (refer to FIG. 14(c)) of setting update flags inside pages.

First, an update page is identified (S601), and the identified page is rewritten (S602). Next, an update flag of the page individual information corresponding to the identified page is changed to a value "1" (S603). If another page to be updated exists (Yes at S604), the flow returns to S601 to process the page to be updated.

FIG. 19(b) is a flow chart illustrating an update difference file creating process to be executed by the update difference file creating unit based upon the update flag set in FIG. 18(a) in the update difference flag setting process.

First, a page is sequentially selected starting from the top page from the pages in the DB area (S611). Next, it is judged whether the update flag of the page individual information corresponding to the selected page is "1" (S612). If Yes at S612, the flow advances to S613, whereas if No, the flow jumps to S615.

A copy of the selected page is extracted from the DB area, and the page is added to the difference page in the update difference file (S613). The update flag of the selected page is returned to "0" (S614). It is then judged whether a page not selected exists (S615). If Yes at S615, the flow returns to S611, whereas if No, the process is terminated.

Figure 20:
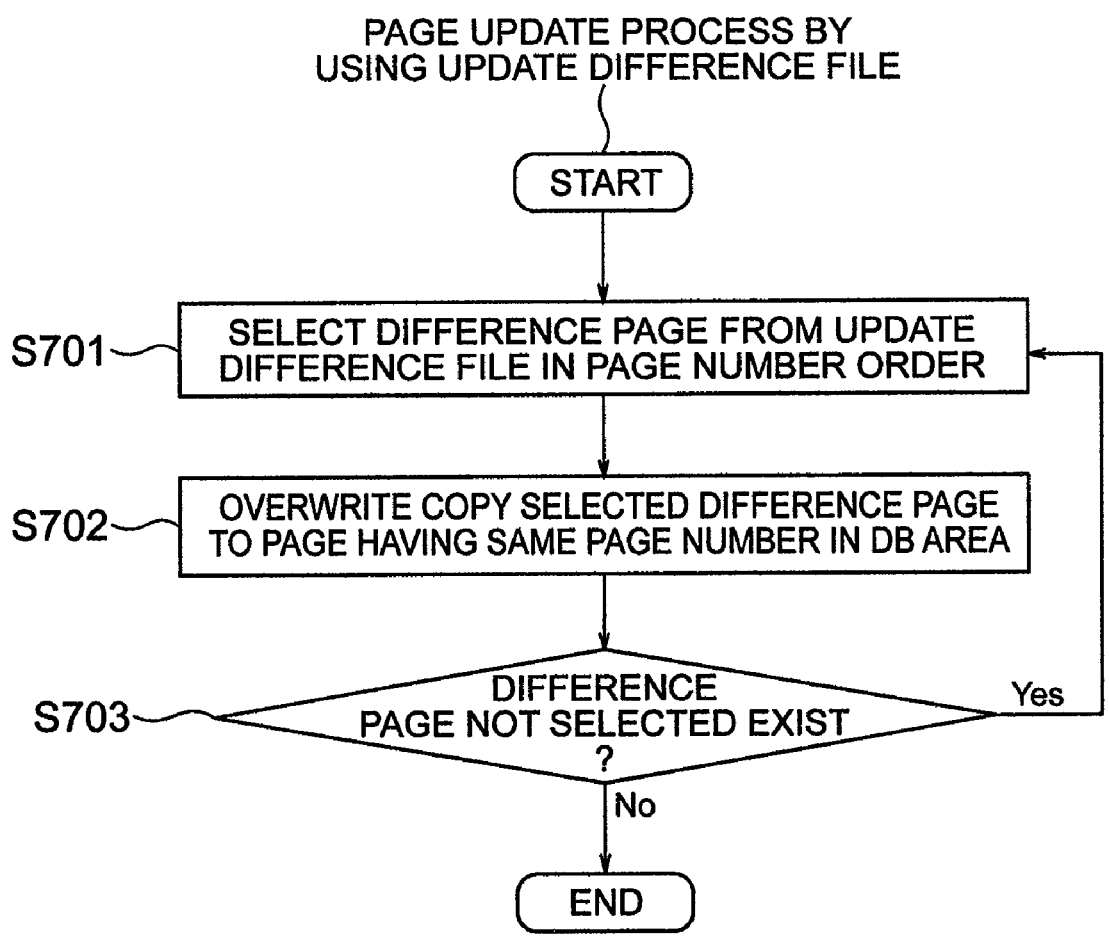
FIG. 20 is a flow chart illustrating a page update process of a center side received update process according to the present invention.

FIG. 20 is a flow chart illustrating a page update process in the center side received update process to be executed by the page update unit.

First, a difference page is selected from the update difference file in the page number order (S701). Next, the selected difference page is overwrite copied to the page having the same page number in the DB area (S702). If there is a difference page still not selected (Yes at S703), the flow returns to S701, whereas a difference page still not selected does not exist (No at S703), the process is terminated.

Figure 21:
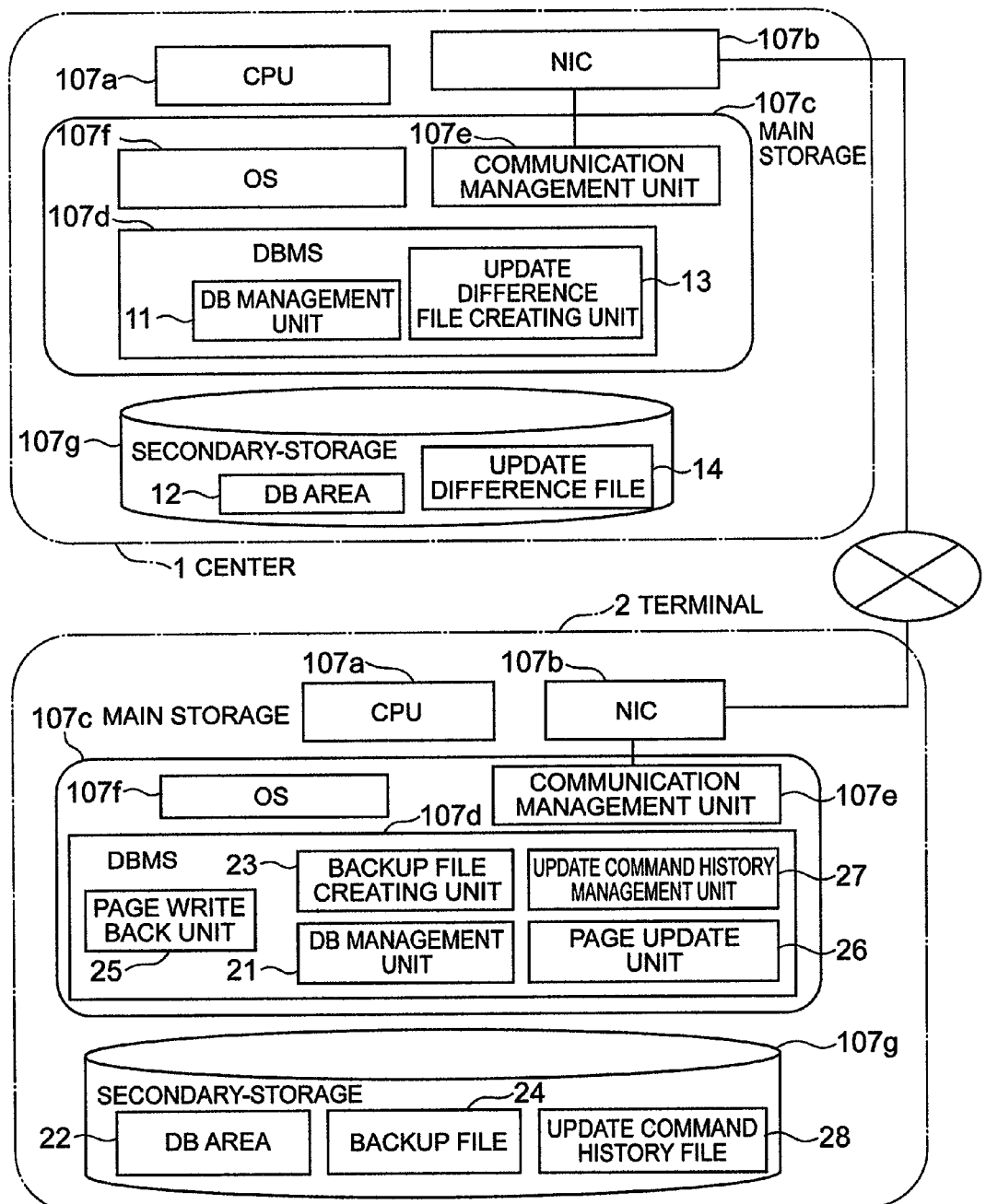
FIG. 21 is a diagram showing the structures of a center and terminal.

FIG. 21 shows the structures of computers realizing the center and terminal of the embodiment. Each computer has a CPU 107a, a network interface card (NIC) 107b, a main storage 107c such as a random access memory (RAM) and a secondary storage 107g such as a hard disk drive (HDD).

CPU 107a executes an operating system (OS) 107f and an application program on the main storage 107c to realize a data base management system (DBMS) 107d. DBMS 107d performs data communications with another apparatus via NIC 107b by using the communication management unit 107e.

DBMS 107d corresponds to the database management unit. The database management unit performs an access to the logical structure data in the database. The logical structure data may have the table format such as shown in FIGS. 2A to 2D, or another format such as tree structure suitable for storing data of Extensible Markup Language (XML) may also be used.

Data transfer between the center and each terminal may be performed by using a storage medium, instead of realizing a communication process utilizing a data communication line of a network via NIC. For example, data output (such as update difference file) from the center is written in a storage medium such as a digital versatile disc-read only memory (DVD-ROM), and as the storage medium is inserted into the terminal, the terminal reads data from the storage medium to input the read data.

The center 1 has a DB management unit 11 and an update difference file creating unit 13 constituting DBMS 107d, a DB area 12 and an update difference file 14 constituting the secondary storage 107g. In this embodiment, although the DB management unit 11 and update difference file creating unit 13 are realized by programs by way of example, objects or hardware having object functions may be used to realize the DB management unit and update difference file creating unit.

The terminal 2 has a DB management unit 21, a backup file creating unit 23, a page write back unit 25, a page update unit 26 and an update command history management unit 27 constituting DBMS 107d, and a DB area 22, a backup file 24 and an update command history file 28 constituting the secondary storage 107g. In this embodiment, although the DB management unit 21, backup file creating unit 23, page write back unit 25, page update unit 26 and update command history management unit 27 are realized by programs by way of example, objects or hardware having object functions may be used to realize these components. These programs may be stored in a storage medium such as CD-ROM and DVD-ROM, and installed in the storage before the system is run.

The DB management units 11 and 21 implemented in DBMS receive an SQL process request to the DB areas 12 and 22, and execute the data processing processes corresponding to the request relative to the DB areas. The SQL process request has a format of designating the logical structure table and its row. The DB management unit 11 of the center 1 executes the center side received update.

The DB management unit 21 of the terminal 2 processes the terminal side received update.

The DB areas 12 and 22 are storage areas for storing pages such as shown in FIG. 3. When the data processing for the logical structure table is executed, the DB management units 11 and 21 convert the table into the physical structure pages in the DB areas 12 and 22 and process the pages, as shown in FIG. 2.

The update difference file creating unit 13 creates the update difference file 14 shown in FIG. 5. The backup file creating unit 23 creates the backup file 24 shown in FIG. 4. The page write back unit 25 and page update unit 26 execute physical update described with reference to FIGS. 2(b) and (d).

The update command history management unit 27 records the SQL update command of the "(1) terminal side received update request" shown in FIG. 1(c) in the update command history file 28, and notifies the request to the DB management unit 21. When the (4) terminal side received update request" shown in FIG. 1(c) is executed again, the SQL update command is read from the update command history file 28, and the request is notified to the DB management unit 21.

The operation of re-execution of the "(4) terminal side received update request" shown in FIG. 1(c) may be performed either by the terminal 2 or by the center 1. If the center 1 makes the terminal 2 execute again the "terminal side received update request", a control command representative of this effect is transmitted to the terminal 2. The terminal 2 waits for the control command, and applies again the "terminal side received update request" received in the past by the terminal.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A data update method to be executed by a database system in which a center apparatus and terminals each have a database management unit for managing each version by using logical structure data of a database as physical structure pages stored in a file of a disk device and running a same version, wherein:

said center apparatus:
responsive to an input of a center apparatus side-received command which said center apparatus receives as a representative of an update content common to said terminals, stores a result of applying said center apparatus side-received command to said logical structure data in a page of a DB area of the file, and
creates an update difference file storing each difference page of each page in the DB area representative of a data change between a version before update and a version after update caused by said center apparatus side-received command; and said terminal:
updates a page to said version after update after being applied with said center apparatus side-received command, by overwrite copying said difference page in said update difference file notified from said center apparatus to the page in a DB area of said terminal,
responsive to a terminal side-received command representative of an update content to be applied to said terminal, stores a result of applying said terminal side-received command to said logical structure data in a page of a file in said DB area;
stores a version before update of the page in said DB area whose version was changed from the version before update to a version after update by said terminal side-received command, in a backup file as a backup page;
overwrites said backup page for the page subjected to a data change to said version after update by said terminal side-received command, prior to data update using said update difference file;
in said process, responsive to an input of said terminal side-received command, of applying said terminal side-received command to said logical structure data, further records an input of said terminal side-received command in a sequential order in an update command history file; and
after said process of overwriting the difference page to the page in the DB area of said terminal, further applies in a sequential order said terminal side-received command read from said update command history file to said logical structure data constituted of the pages of said version after update.

2. A data update method to be executed by a database system in which a center apparatus and terminals each have a database management unit for managing each version by using logical structure data of a database as physical structure pages stored in a file of a disk device and running a same version, wherein:

said center apparatus:
responsive to an input of a center apparatus side-received command which said center apparatus receives as a representative of an update content common to said terminals, stores a result of applying said center apparatus side-received command to said logical structure data in a page of a DB area of the file, and
creates an update difference file storing each difference page of each page in the DB area representative of a data change between a version before update and a version after update caused by said center apparatus side-received command; and said terminal:
updates a page to said version after update after being applied with said center apparatus side-received command, by overwrite copying said difference page in said update difference file notified from said center apparatus to the page in a DB area of said terminal,
responsive to a terminal side-received command, stores a result of applying said terminal side-received command to said logical structure data in a page of a file in said DB area,
stores a version before update of the page in said DB area whose version was changed from the version before update to a version after update by said terminal side-received command, in a backup file as a backup page, and
overwrites said backup page for the page subjected to a data change to said version after update by said terminal side-received command, prior to data update using said update difference file; and
said process of storing in said backup file:
if a page to be updated is stored in said backup file as said backup page in response to a current one of said terminal side-received update command, sets a backup flag of the page to be updated so as to indicate an already stored state, and if a page in the already stored state of said backup flag is to be updated in response to a next or succeeding one of said terminal side-received command, omits said step of storing the page in said backup page.

3. The data update method according to claim 2, wherein:
said process of creating said update difference file
stores a page in said DB area of the version before update, before said center apparatus side-received command is applied; and
compares the version before update with the version after update, and extracts as the difference page, a change page existing at a same location and having a different data content, an addition page not existing in the version before update and existing in the version after update, and a deletion page existing in the version before update and not existing in the version after update.

4. The data update method according to claim 2, wherein:
said process of creating said update difference file,
when said center apparatus side-received command is applied to the page of the version before update in said DB area, sets an update flag representative of page update, at a position corresponding to page update in an update flag array corresponding to a page array, so as to indicate an already updated state; and
sequentially refers to said update flag array and extracts a page having said update flag in the already updated state as the difference page.

5. The data update method according to claim 2, wherein:
said process of creating said update difference file,
when said center apparatus side-received command is applied to the page of the version before update in said DB area, sets an update flag representative of page update correlated to each page, so as to indicate an already updated state; and
sequentially refers to said update flag correlated to each page and extracts a page having said update flag in the already updated state as the difference page.

6. A database system in which a center apparatus and terminals each have a database management unit for managing each version by using logical structure data of a database as physical structure pages stored in a file of a disk device and running a same version, wherein:
said center apparatus is configured:
responsive to an input of a center apparatus side-received command which said center apparatus receives as a representative of an update content common to said terminals, to store a result of applying said center apparatus side-received command to said logical structure data in a page of a DB area of the file, and
to create an update difference file storing each difference page of each page in the DB area representative of a data change between a version before update and a version after update caused by said center apparatus side-received command; and
said terminal is configured:
to update a page to said version after update after being applied with said center apparatus side-received command, by overwrite copying said difference page in said update difference file notified from said center apparatus to the page in a DB area of said terminal,
responsive to a terminal side-received command, to store a result of applying said terminal side-received command to said logical structure data in a page of a file in said DB area,
to store a version before update of the page in said DB area whose version was changed from the version before update to a version after update by said terminal side-received command, in a backup file as a backup page,
to overwrite said backup page for the page subjected to a data change to said version after update by said terminal side-received command, prior to data update using said update difference file;
if a page to be updated is stored in said backup file as said backup page in response to a current one of said terminal side received update command, to set a backup flag of the page to be updated so as to indicate an already stored state, and
if a page in the already stored state of said backup flag is to be updated in response to a next or succeeding one of said terminal side received command, to omit said storing of the page in said backup page.

7. The data update system according to claim 6, wherein:
said center apparatus is further configured:
to store a page in said DB area of the version before update, before said center apparatus side-received command is applied; and
to compare the version before update with the version after update, and extract as the difference page stored in the update difference file, a change page existing at a same location and having a different data content, an addition page not existing in the version before update and existing in the version after update, and a deletion page existing in the version before update and not existing in the version after update.

8. The data update system according to claim 6, wherein:
said center apparatus is further configured:
when said center apparatus side-received command is applied to the page of the version before update in said DB area, to set an update flag representative of page update, at a position corresponding to page update in an update flag array corresponding to a page array, so as to indicate an already updated state; and
to sequentially refer to said update flag array and extracts a page having said update flag in the already updated state as the difference page stored in said update difference file.

9. The data update system according to claim 6, wherein:
said center apparatus is further configured:
when said center apparatus side received command is applied to the page of the version before update in said DB area, to set an update flag representative of page update correlated to each page, so as to indicate an already updated state; and
to sequentially refer to said update flag correlated to each page and extract a page having said update flag in the already updated state as the difference page stored in said update difference file.

* * * * *